US012623353B2

(12) United States Patent
Maegawa

(10) Patent No.: US 12,623,353 B2
(45) Date of Patent: May 12, 2026

(54) SUBSTRATE TREATING APPARATUS WITH POSTURE TURNING UNIT

(71) Applicant: SCREEN Holdings Co., Ltd., Kyoto (JP)

(72) Inventor: Tadashi Maegawa, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 228 days.

(21) Appl. No.: 18/453,917

(22) Filed: Aug. 22, 2023

(65) Prior Publication Data

US 2024/0066715 A1 Feb. 29, 2024

(30) Foreign Application Priority Data

Aug. 24, 2022 (JP) ................................. 2022-133227

(51) Int. Cl.
*B25J 11/00* (2006.01)

(52) U.S. Cl.
CPC .......... *B25J 11/0095* (2013.01); *B25J 11/005* (2013.01)

(58) Field of Classification Search
CPC .............................. B25J 11/0095; B25J 11/005
USPC .................................................. 700/292, 293
See application file for complete search history.

(56) References Cited

U.S. PATENT DOCUMENTS

| | | | |
|---|---|---|---|
| 6,036,426 A | 3/2000 | Hillman | .................... 414/331.14 |
| 6,368,040 B1 | 4/2002 | Yamasaki | ...................... 414/222 |
| 2006/0137726 A1* | 6/2006 | Sano | ................. H01L 21/67028 |
| | | | 118/696 |
| 2008/0216880 A1* | 9/2008 | Shiomi | ............. H01L 21/67781 |
| | | | 134/133 |

(Continued)

FOREIGN PATENT DOCUMENTS

| | | |
|---|---|---|
| JP | H11-233584 A | 8/1999 |
| JP | 2010-093230 A | 4/2010 |

(Continued)

OTHER PUBLICATIONS

Office Action mailed May 2, 2024 issued in corresponding Taiwan Patent Application No. 112131307.

(Continued)

*Primary Examiner* — Gerald McClain
(74) *Attorney, Agent, or Firm* — OSTROLENK FABER LLP

(57) ABSTRACT

A substrate treating apparatus includes a substrate holder that holds a treatment substrate group, a second transport mechanism configured to pull out and transport a divided substrate group from the treatment substrate group held by the substrate holder, and an underwater posture turning unit to turn the orientation of the divided substrate group from vertical to horizontal. A center robot takes and transports one substrate from the divided substrate group to the one substrate to a single-wafer processing unit. A lifting and lowering unit moves the substrate holder and the second trans- (Continued)

port mechanism upward/downward relatively. An alignment direction relative moving unit moves the substrate holder and the second transport mechanism horizontally in an alignment direction where the treatment substrate group is aligned. The second transport mechanism includes paired chucks having holding grooves and passing grooves arranged alternately.

3 Claims, 18 Drawing Sheets

(56)                     References Cited

U.S. PATENT DOCUMENTS

| | | | |
|---|---|---|---|
| 2010/0068014 A1 | 3/2010 | Mitsuyoshi et al. ..... | 414/225.01 |
| 2015/0332940 A1 | 11/2015 | Wang et al. | |
| 2018/0090358 A1 | 3/2018 | Miyamoto | |
| 2021/0111038 A1 | 4/2021 | Kanagawa et al. | |
| 2021/0111054 A1 | 4/2021 | Kanagawa et al. | |
| 2022/0172966 A1 | 6/2022 | Choi et al. | |

FOREIGN PATENT DOCUMENTS

| | | | | | |
|---|---|---|---|---|---|
| JP | 2016-502275 A | | 1/2016 | | |
| JP | 2018-056341 A | | 4/2018 | | |
| JP | 2021-064652 A | | 4/2021 | | |
| JP | 2021-064654 A1 | | 4/2021 | | |
| JP | 2022-087065 A | | 6/2022 | | |
| JP | 2022-171173 A | | 11/2022 | | |
| TW | 200631680 A | | 9/2006 | | |
| TW | 201020194 A | * | 6/2010 | ....... | H01L 21/67754 |
| TW | 201020194 A1 | | 6/2010 | | |

OTHER PUBLICATIONS

Extended European Search Report dated Feb. 2, 2024 in corresponding European Patent Application No. 23192422.6.
Notice of Allowance dated Jan. 27, 2026 for corresponding Japanese Patent Application No. 2022-133227 and its English translation.

* cited by examiner

VIEW BB

VIEW CC

Fig. 8

Fig. 12A
Fig. 12B
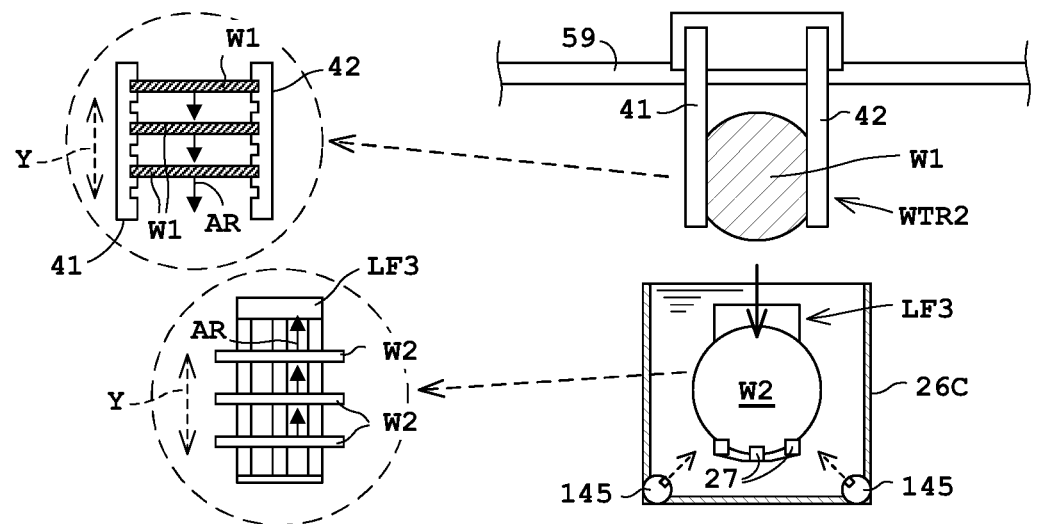
Fig. 12C
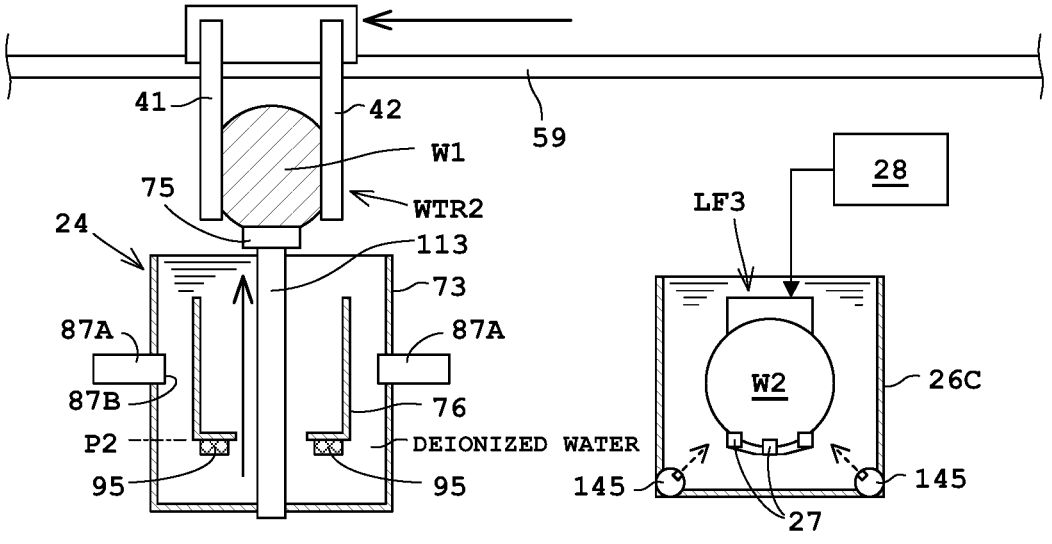

Fig. 17A
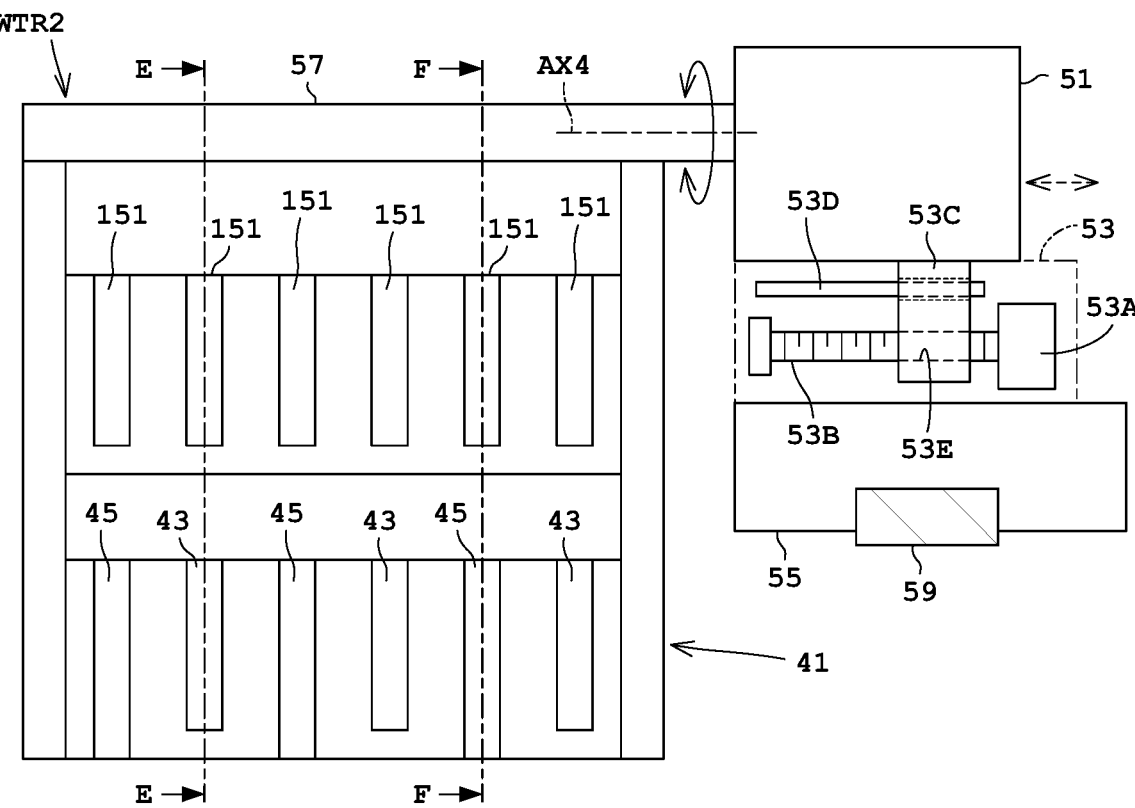
Fig. 17B
VIEW EE
Fig. 17C
VIEW FF
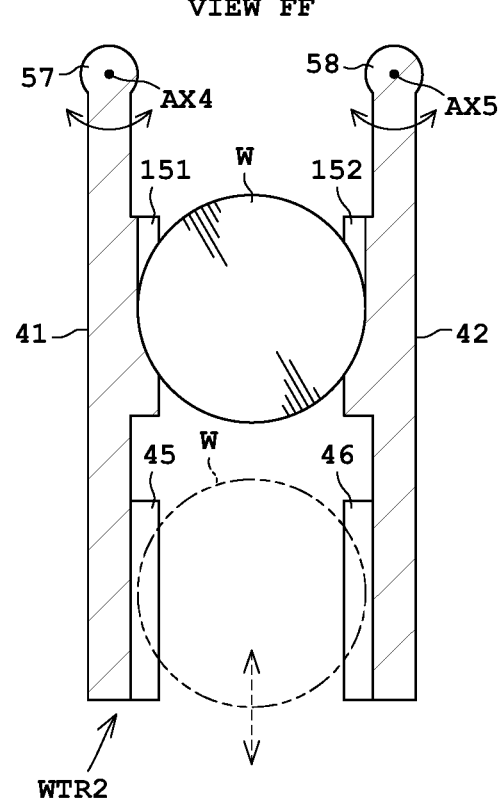

SUBSTRATE TREATING APPARATUS WITH POSTURE TURNING UNIT

CROSS-REFERENCE TO RELATED APPLICATIONS

This application claims priority to Japanese Patent Application No. 2022-133227 filed Aug. 24, 2022, the subject matter of which is incorporated herein by reference in entirety.

TECHNICAL FIELD

The present invention relates to a substrate treating apparatus for performing predetermined treatment on a substrate, such as a semiconductor substrate, a substrate for flat panel display (FPD) like liquid crystal display and organic electroluminescence (EL) display, a glass substrate for photomask, and an optical disk substrate.

BACKGROUND ART

Such currently-used apparatus of this type include one having a batch treatment unit, a single-wafer treatment unit, and a rotating mechanism (see, for example, Japanese Patent Publication (Translation of PCT Application) No. 2016-502275A). The batch treatment unit performs treatment on a plurality of substrates collectively. The single-wafer treatment unit performs treatment on substrates one by one.

In the batch treatment unit, treatment is performed in such a state that the substrates are in a vertical posture. On the other hand, in the single-wafer module, the treatment is performed in such a state that the substrates are in a horizontal posture. Accordingly, the rotating mechanism turns the substrates in the vertical posture after the treatment by the batch treatment unit to the horizontal posture before the substrates are transported to the single-wafer module (see, for example, Japanese Patent Publication (Translation of PCT Application) No. 2016-502275A).

Japanese Unexamined Patent Publication No. 2021-064652A discloses a substrate processing system including a rinse liquid bath, a single-substrate-type processing part, a six-axis articulated robot, and a first holder. The first holder can hold a plurality of substrates in a vertical posture arranged at a small pitch. Moreover, the first holder is movable between baths. Moreover, the first holder is movable upward and downward, and can immerse the plurality of substrates in deionized water within the rinse liquid bath. In the rinse liquid bath, a second holder is provided. The second holder has holding grooves and passing grooves arranged at a large pitch. The holding grooves and the passing grooves are arranged alternately.

The first holder is moved downward in the rinse liquid bath. When the first holder is moved lower than the second holder, the second holder receives substrates, arranged at a larger pitch, from the first holder. That is, the substrates are held in the deionized water within the rinse liquid bath by either the first holder or the second holder. The articulated robot firstly picks up a substrate in the vertical posture that is held by the second holder in the deionized water within the rinse liquid bath, and then transports the substrate to the single-substrate processing part.

After the substrate held by the second holder is transported, the first holder is moved upward to a position slightly lower than the second holder. Next, the articulated robot picks up the substrate in the vertical posture that is held by the first holder in the deionized water within the rinse liquid bath, and then transports the substrate to the single-substrate processing part.

Japanese Unexamined Patent Publication No. 2018-056341A discloses a substrate processing apparatus provided with a posture changing mechanism (posture changing device and a rotation mechanism).

SUMMARY OF INVENTION

Technical Problem

However, the currently-used substrate treating apparatus possess the following drawback. The batch processing unit performs treatment on a plurality of substrates collectively. The substrates are arranged at a pitch of 5 mm, for example. Accordingly, when the substrates are transported to the single-substrate processing part, a hand in a horizontal posture of a horizontal substrate transporting robot cannot enter a gap between two adjacent substrates arranged at the pitch. This may result in impossible taking of one substrate with the hand. Therefore, it is necessary to devise a way to widen the gap.

It is noted that, in Japanese Unexamined Patent Publication No. 2021-064652A, the first holder and the second holder holds a plurality of substrates one above the other by in the deionized water within the rinse liquid bath. This can widen the gap between the two adjacent substrates. On the other hand, the rinse liquid bath is elongated (deepens) in an up-down direction. Moreover, there needs operation of taking the substrates in the vertical posture from the deionized water even with a function that the first holder moves upward and downward, leading to a complex construction.

The present invention has been made regarding the state of the art noted above, and its one object is to provide a substrate treating apparatus that allows a horizontal substrate transporting robot to easily take out one substrate from a plurality of substrates subjected to treatment collectively.

Solution to Problem

The present invention is constituted as stated below to achieve the above object. One aspect of the present invention provides a substrate treating apparatus. The substrate treating apparatus includes a batch processing unit configured to perform treatment on a plurality of substrates collectively, and a single-wafer processing unit configured to perform treatment on the substrates one by one. The substrate treating apparatus further includes a vertical substrate holder configured to hold a treatment substrate group treated in the batch processing unit and constituted by the plurality of substrates arranged in a vertical posture at a given pitch, a vertical substrate transporting robot configured to pull out the plurality of substrates by two times from the treatment substrate group, held by the vertical substrate holder, to generate divided substrate groups, and capable of transporting separately the divided substrate groups pulled out by two times, a posture turning unit configured to turn a posture of the divided substrate groups, transported by the vertical substrate transporting robot, from vertical to horizontal collectively, a horizontal substrate transporting robot configured to take one substrate from each of the divided substrate groups, whose posture is turned to horizontal by the posture turning unit, and to transport the one substrate to the single-wafer processing unit, a relative lifting and lowering unit configured to move the vertical substrate holder and the vertical substrate transporting robot upward and downward relatively, and an alignment direction relative moving unit configured to move the vertical substrate holder and the vertical substrate transporting robot relatively horizontally in an alignment direction where the treatment substrate group is aligned. The vertical substrate transporting robot includes one-paired chucks configured to grip two sides of each outer edge of the substrates in the treatment substrate group individually, plural-paired holding grooves provided in the one-paired chucks in such a manner so as to face each other and configured to hold the substrates one by one in the vertical posture, and plural-paired passing grooves provided in the one-paired chucks in such a manner so as to face each other and configured to pass the substrates one by one in the vertical posture, the holding grooves and the passing grooves are alternately arranged one by one in the alignment direction of the treatment substrate group, the relative lifting and lowering unit performs relative lifting and lowering movement two times to each of the vertical substrate holder and the vertical substrate transporting robot at a given substrate delivery position, the vertical substrate transporting robot takes a first divided substrate group, in which the substrates are aligned alternately, from the vertical substrate holder, by a first relative lifting and lowering movement while holding with the holding grooves, and transports the taken first divided substrate group to the posture turning unit, while the vertical substrate transporting robot passes a residual second divided substrate group through the passing grooves by the first relative lifting and lowering movement, thereby keeping the second divided substrate group held with the vertical substrate holder, the alignment direction relative moving unit moves the vertical substrate transporting robot and the vertical substrate holder, from which the first divided substrate group is taken out and which holds the second divided substrate group, relatively horizontally by the given pitch in the alignment direction of the treatment substrate group, and after the horizontal movement, the vertical substrate transporting robot receives the second divided substrate group, held with the vertical substrate holder by the second relative lifting and lowering movement, while holding with the holding grooves, and transports the received second divided substrate group to the posture turning unit.

With the substrate treating apparatus according to this embodiment, the one-paired chucks of the vertical substrate transporting robot includes the holding grooves and the passing grooves arranged one by one alternately. Accordingly, the one-paired chucks can pull out the substrates alternately from the treatment substrate group constituted by a plurality of substrates held by the vertical substrate holder, and transports the pulled-out divided substrate groups to the posture turning unit individually. This can widen the gap between the two adjacent substrates. Moreover, the posture turning unit turns the posture of the pulled out substrates from vertical to horizontal. Accordingly, the hand of the horizontal substrate transporting robot can enter between the two adjacent substrates, thereby taking one substrate easily, for example.

Moreover, it is preferred in the aspect of the present invention that the substrate treating apparatus further includes an upstream vertical substrate transporting robot that can collectively transport the treatment substrate group to the vertical substrate holder. The upstream vertical substrate transporting robot can collectively transport the treatment substrate group to the vertical substrate holder. Moreover, the vertical substrate transporting robot can transport the divided substrate groups individually that are pulled out by two times from the treatment substrate group held by the vertical substrate holder.

Moreover, it is preferred in the aspect of the substrate treating apparatus according to the present invention that the vertical substrate transporting robot further includes plural-paired upper holding grooves each configured to hold one substrate of the substrates in a vertical posture, the upper holding grooves being positioned above the holding grooves and the passing grooves, and being provided on the one-paired chucks so as to face one another, and that the plural-paired upper holding grooves are arranged in the alignment direction of the treatment substrate group at a gap equal to the pitch at which the treatment substrate group is aligned.

Accordingly, one-paired chucks have two functions. Specifically, a first function is that the holding grooves and the passing grooves can hold substrates alternately. A second function is that the one-paired upper holding grooves can hold the aligned substrates not one by one alternately but successively. Moreover, the vertical substrate transporting robot having the second function is not necessarily provided other than the vertical substrate transporting robot having the first function. Accordingly, the number of transport robots can be reduced.

Moreover, it is preferred in the aspect of the present invention that the substrate treating apparatus further includes a rinse tank configured to store a rinse liquid, that the relative lifting and lowering unit includes a lifting mechanism configured to move the vertical substrate holder upward and downward, and that the lifting mechanism causes the treatment substrate group or the second divided substrate group to be immersed in the rinse liquid stored in the rinse tank when the vertical substrate transporting robot does not transport the divided substrate groups individually. Since the substrates are immersed in the rinse liquid stored in the rinse tank, preventing drying of the substrates.

Moreover, it is preferred in the aspect of the substrate treating apparatus according to the present invention that the posture turning unit includes an in-tank carrier having a front opening configured to pass the divided substrate groups individually, two side walls where the plural-paired substrate holding grooves for accommodating each of the divided substrate groups passing the front opening face one another, and a back wall having a back opening whose area is smaller than an area of the front opening and facing the front opening, a carrier lifter having a carrier supporting portion configured to support the in-tank carrier, and a carrier lifting mechanism configured to move the carrier supporting portion upward and downward, an immersion tank configured to accommodate the in-tank carrier and the carrier supporting portion, and to store an immersion liquid, a carrier rotating mechanism configured to rotate the in-tank carrier around a horizontal axis, the in-tank carrier being immersed in the immersion liquid within the immersion tank, for collectively turning each posture of the divided substrate groups from vertical to horizontal, a pusher configured to hold, from below, each of the divided substrate groups held by the vertical substrate transporting robot, a pusher lifting mechanism configured to move the pusher upward and downward, and a pusher rotating mechanism configured to rotate the pusher around a vertical axis, when the front opening of the in-tank carrier is directed upward, the pusher can pass the back opening and the front opening of the in-tank carrier and move upward and downward between a position adjacent to a bottom face of the immersion tank and a position above the immersion tank, and when pusher is changed from a state above the in-tank carrier to a state below the in-tank carrier, the in-tank carrier receives the divided substrate groups from the pusher individually.

The posture turning unit causes the in-tank carrier to be immersed in the immersion liquid in the immersion tank while containing one of the divided substrate groups into the in-tank carrier. Thereafter, the posture turning unit rotates the in-tank carrier immersed in the immersion liquid around the horizontal axis to turn the posture of the divided substrate group from vertical to horizontal. Accordingly, the substrates are immersed in the immersion liquid until the horizontal substrate transporting robot takes the substrates in the horizontal posture from the in-tank carrier. Consequently, drying of the substrates can be prevented, resulting in suppressed pattern collapse of the substrates.

It is preferred in the aspect of the present invention that the substrate treating apparatus further includes a control unit, that the control unit causes the pusher lifting mechanism to move the pusher upward to the above of the in-tank carrier whose front opening is directed upward, whereby the first divided substrate group is received from the vertical substrate transporting robot by the pusher, that the control unit causes the pusher rotating mechanism to rotate the pusher, holding the first divided substrate group, by 180 degrees around the vertical axis, that the control unit causes the in-tank carrier to move upward relatively, whereby the first divided substrate group rotated by 180 degrees is accommodated in the in-tank carrier, and that the control unit causes the carrier rotating mechanism to rotate the in-tank carrier immersed in the immersion liquid within the immersion tank around the horizontal axis, whereby a posture of the first divided substrate group is turned from vertical to horizontal.

The first divided substrate group can face any direction before the first divided substrate group is accommodated in the in-tank carrier.

Moreover, it is preferred in the aspect of the substrate treating apparatus according to the present invention that the carrier rotating mechanism includes two shafts configured to grip the in-tank carrier and release gripping of the in-tank carrier, and a rotation driving unit configured to rotate the two shafts around the horizontal axis. The two shafts and the carrier rotating mechanism can turn the posture of the divided substrate groups in liquid that are accommodated in the in-tank carrier.

Advantageous Effects of Invention

With the substrate treating apparatus according to the aspect of the present invention, the horizontal substrate transporting robot can easily take out one substrate from a plurality of substrates subjected to treatment collectively.

BRIEF DESCRIPTION OF DRAWINGS

For the purpose of illustrating the invention, there are shown in the drawings several forms which are presently preferred, it being understood, however, that the invention is not limited to the precise arrangement and instrumentalities shown.

FIG. 8 is a front view of the underwater posture turning unit.

FIG. 10 is a flowchart illustrating first-half of the operation of the underwater posture turning and the like.

FIG. 11 is a flowchart illustrating second-half of the operation of the underwater posture turning and the like.

FIGS. 12A to 12C are each a front view illustrating operation of the underwater posture turning and the like.

FIGS. 13A to 13C are each a front view illustrating operation of the underwater posture turning and the like.

FIGS. 14A to 14C are each a front view illustrating operation of the underwater posture turning and the like.

FIG. 17A is a side view of one chuck, a swing unit and the like in a second transport mechanism according to one modification, FIG. 17B is a longitudinal sectional view of holding grooves and upper holding grooves seen from an arrow EE in FIG. 17A, and FIG. 17C is a longitudinal sectional view of passing grooves and the upper holding grooves seen from an arrow FF in FIG. 17A.

DESCRIPTION OF EMBODIMENTS

Figure 1:
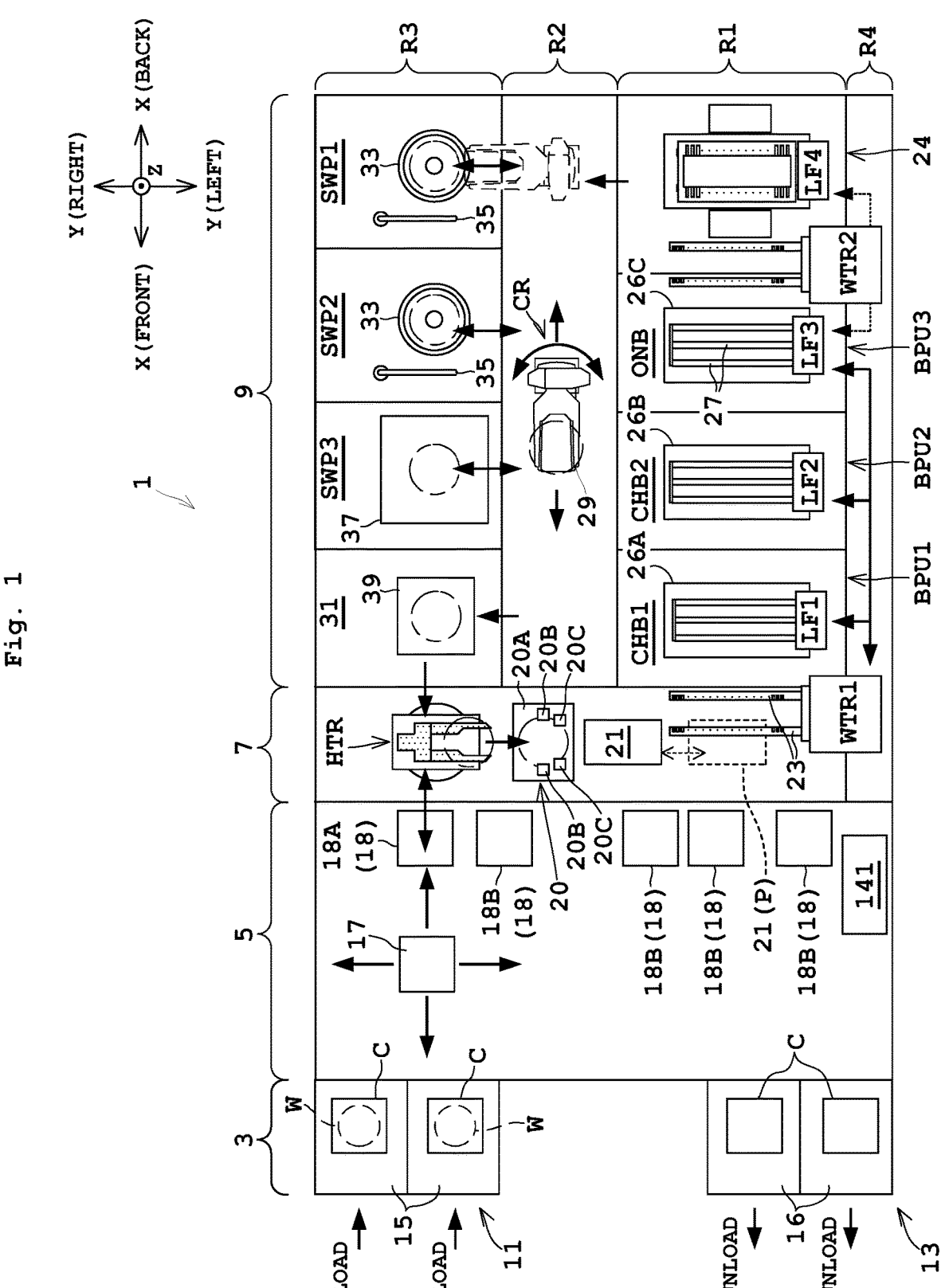
FIG. 1 is a plan view schematically illustrating a configuration of a substrate treating apparatus according to an embodiment of the present invention.

The following describes one embodiment of the present invention with reference to drawings. FIG. 1 is a plan view of a substrate treating apparatus 1 according to one embodiment.

1. Overall Configuration

A substrate treating apparatus 1 includes a loading and unloading block 3, a stocker block 5, a transferring block 7, and a treating block 9.

The substrate treating apparatus 1 treats substrates W. The substrate treating apparatus 1 performs chemical treatment, cleaning treatment, dry treatment, and the like, for example, on the substrates W. The substrate treating apparatus 1 adopts a process system in combination of a batch type and a single-wafer type (so-called hybrid type). In the batch type, treatment is performed on a plurality of substrates W collectively in a vertical posture. In the single wafer type, treatment is performed on the substrates W one by one in a horizontal posture.

In the present specification, the direction in which the loading and unloading block 3, the stocker block 5, the transferring block 7, and the treating block 9 are arranged is referred to as a "front-back direction X" for convenience. The front-back direction X is horizontal. One direction of the front-back direction X from the stocker block 5 to the loading and unloading block 3 is referred to as "forward". The direction opposite to the forward direction is referred to as "rearward (backward)". A horizontal direction orthogonal to the front-back direction X is referred to as a "transverse direction Y". Moreover, one direction of the transverse direction Y is referred to as "rightward", as appropriate. The direction opposite to the rightward direction is referred to as "leftward". The perpendicular direction relative to the horizontal direction is referred to as a "vertical direction Z". For reference, the drawings show front, back, right, left, up, and down, as appropriate.

2. Loading and Unloading Block

The loading and unloading block 3 includes a loading unit 11 and an unloading unit 13. The loading unit 11 and the unloading unit 13 are arranged in the transverse direction Y. A plurality of (e.g., twenty-five) substrates W are accommodated within one carrier C in a stack manner at uniform pitches in a horizontal posture. The carrier C accommodating untreated substrates W is placed on the loading unit 11. The loading unit 11 includes two mount tables 15, for example, on which the carrier C is placed. The carrier C has a plurality of grooves (not shown) formed therein for separating faces of the substrates W individually and housing the substrates W, respectively. Examples of the carrier C include a front opening unified pod (FOUP). The FOUP is a sealing container. The carrier C may be an opened container, which type is not specified.

The unloading unit 13 is arranged opposite to the loading unit 11 across a center portion of the substrate treating apparatus 1 in the transverse direction Y. The unloading unit 13 is arranged leftward Y of the loading unit 11. The unloading unit 13 accommodates the treated substrates W into the carrier C, and unloads the carrier C itself. Similar to the loading unit 11, the unloading unit 13 functioning as above includes two mount tables 16, for example, on which the carrier C is placed. The loading unit 11 and the unloading unit 13 are also referred to as a load port.

3. Stocker Block

The stocker block 5 adjoins rearward X of the loading and unloading block 3. The stocker block 5 includes a transport mechanism (robot) 17 and a plurality of shelves 18.

The shelves 18 are classified into a shelf 18A for delivering substrates W and a shelf 18B for storage. The transport mechanism 17 transports a carrier C, containing untreated substrates W, from one of two loading units 11 to the shelf 18 (18A, 18B). Moreover, the transport mechanism 17 transports the carrier C, containing the treated substrates W, from the shelf 18 (18A, 18B) to one of the two unloading units 13. The transport mechanism 17 transports the carrier C to shelves 18, including shelves 18A, in response to a schedule that defines an order of treatment. The transport mechanism 17 includes a gripper configured to grip a projected portion on an upper face of the carrier C, or a hand configured to support the carrier C while contacting a lower face of the carrier C. The transport mechanism 17 is driven by an electric motor.

4. Transferring Block

The transferring block 7 adjoins rearward X of the stocker block 5. The transferring block 7 includes a collective transport mechanism (robot) HTR.

The collective transport mechanism HTR is arranged rightward Y and rearward X of the stocker block 5. The collective transport mechanism HTR transports a plurality of substrates W collectively. The collective transport mechanism HTR includes a plurality of (e.g., twenty-five) hands 19A. The hands 19A each hold one substrate W.

Figure 2:
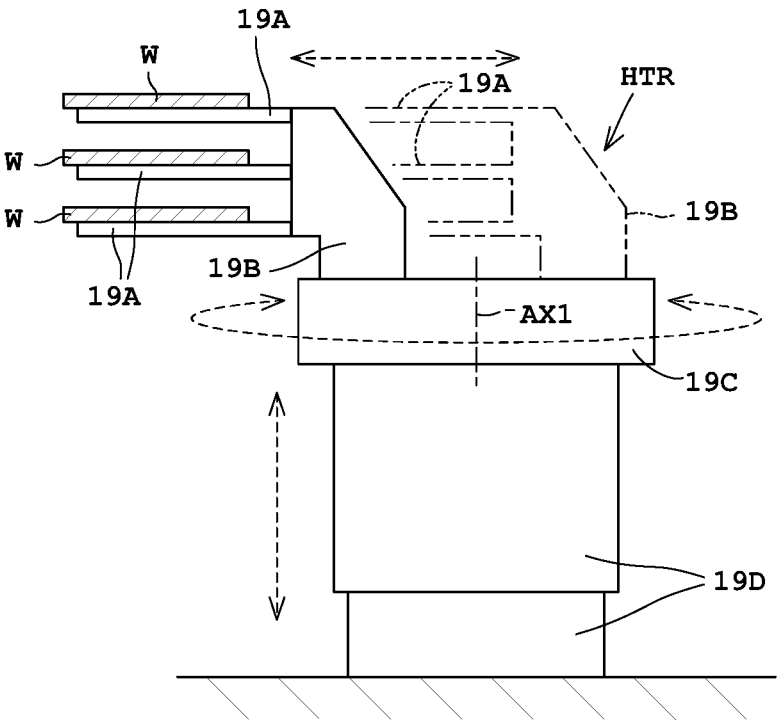
FIG. 2 is a side view of a collective transport mechanism.

As illustrated in FIG. 2, the collective transport mechanism HTR further includes a hand supporting portion 19B, an advancing and withdrawing portion 19C, and a lifting and rotating portion 19D. Here in FIG. 2, the collective transport mechanism HTR includes three hands 19A for convenience of illustration. The hand supporting portion 19b supports a plurality of hands 19A. Accordingly, the hands 19A are moved integrally. The advancing and withdrawing portion 19C causes the hands 19A to advance and withdraw via the hand supporting portion 19B. The lifting and rotating portion 19D rotates the advancing and withdrawing portion 19C around a vertical axis AX1, thereby rotating the hands 19A and the like around the vertical axis AX1. Moreover, the lifting and rotating portion 19D moves the advancing and withdrawing portion 19C upward and downward, thereby moving the hands 19A and the like upward and downward. The lifting and rotating portion 19D is fixed on the floor. That is, the lifting and rotating portion 19D does not move in the horizontal direction. Here, the advancing and withdrawing portion 19C and the lifting and rotating portion 19D each include an electric motor.

The collective transport mechanism HTR can transport only one substrate W with one hand not shown. The collective transport mechanism HTR takes a plurality of (e.g., twenty-five) substrates W from the carrier C, placed on the deliver shelf 18A in the stocker block 5, collectively, and transports the substrates W to a posture turning unit 20, which is to be mentioned later. Moreover, the collective transport mechanism HTR receives the plurality of (e.g., twenty-five) treated substrates W collectively from the treating block 9, which is to be mentioned later. Then, the collective transport mechanism HTR transports the treated substrates W collectively to the carrier C placed on the deliver shelf 18A in the stocker block 5.

The transferring block 7 further includes the posture turning unit 20 and a pusher mechanism 21. The collective transport mechanism HTR, the posture turning unit 20, and the pusher mechanism 21 are arranged in this order in the Y-direction. FIGS. 3A to 3F are each a view for explanation of the posture turning unit 20 and the pusher mechanism 21.

Figure 3A:
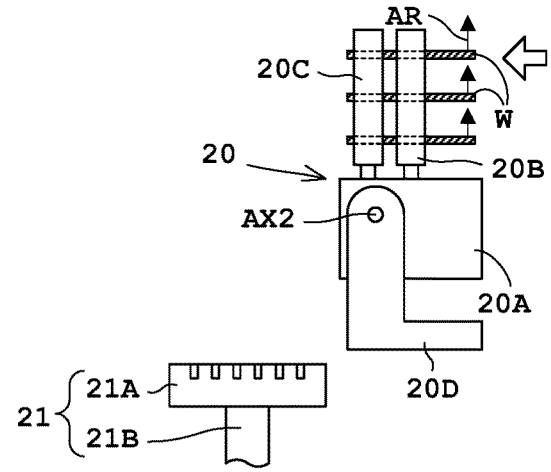
FIGS. 3A to 3F are each a side view for explanation of a posture turning unit and a pusher mechanism in a transferring block.

The posture turning unit 20 turns a posture of a plurality of (e.g., two or more) substrates W, transported from the collective transport mechanism HTR, from horizontal to vertical. As shown in FIG. 3A, the posture turning unit 20 includes a support base 20A, one-paired horizontal holders 20B, one-paired perpendicular holders 20C, and a rotation driving portion 20D.

As shown in FIGS. 1 and 3A, the one-paired horizontal holders 20B and the one-paired perpendicular holders 20C are provided on the support base 20A. When a plurality of (e.g., twenty-five) substrates W are in a horizontal posture, the one-paired horizontal holders 20B support the substrates W from below while contacting a lower face of each of the substrates W. Moreover, when a plurality of substrates W are in a vertical posture, for example, the one-paired perpendicular holders 20C hold the substrates W.

The rotation driving portion 20D supports the support base 20A so as to be rotatable around a horizontal axis AX2. Moreover, the rotation driving portion 20D rotates the support base 20A around the horizontal axis AX2, whereby a posture of the substrates W held by the holders 20B and 20C is turned from horizontal to vertical.

Figure 3B:
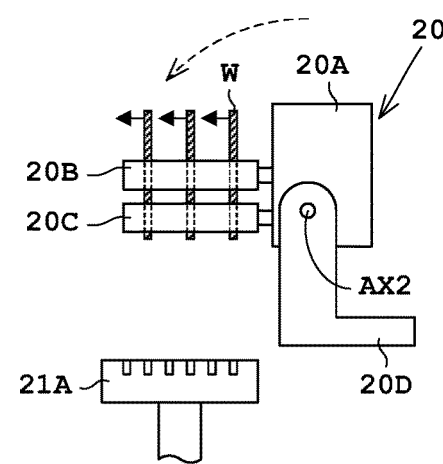
Figure 3C:
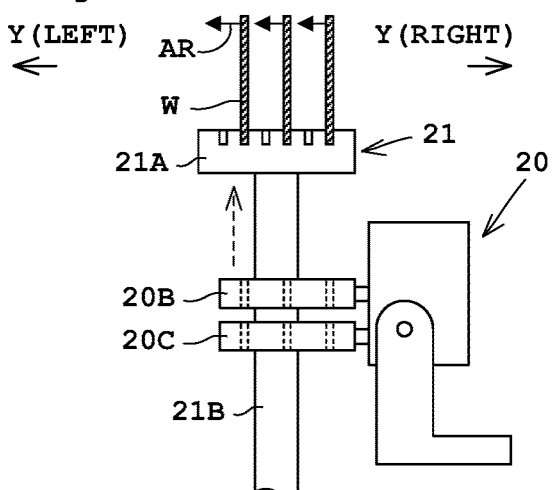
Figure 3D:
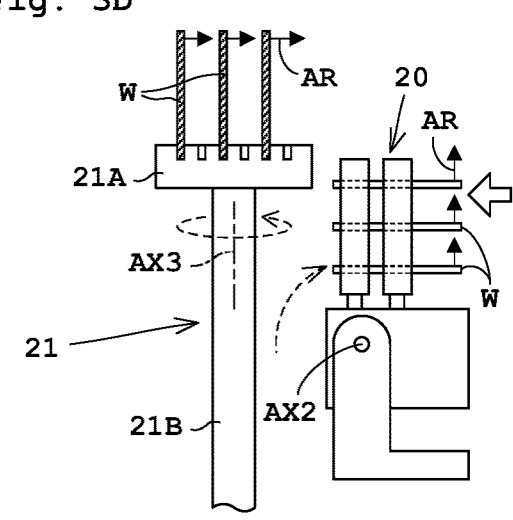
Figure 3E:
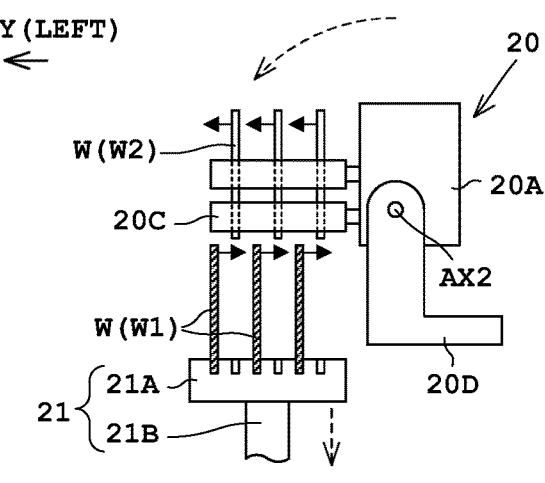
Figure 3F:
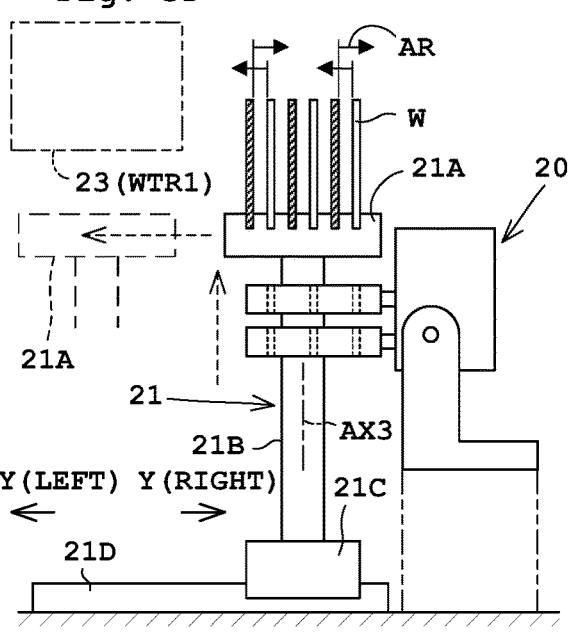

As illustrated in FIGS. 1 and 3F, the pusher mechanism 21 includes a pusher 21A, a lifting and rotating portion 21B, a horizontally moving portion 21C, and a rail 21D. The pusher 21A supports each lower part of plurality of (e.g., fifty) substrates W in the vertical posture. The lifting and rotating portion 21B is connected to a lower face of the pusher 21A. The lifting and rotating portion 21B expands and contracts, thereby moving the pusher 21A in the up-down direction. Moreover, the lifting and rotating portion 21B rotates the pusher 21A around a vertical axis AX3. The horizontally moving portion 21C supports the lifting and rotating portion 21B. The horizontally moving portion 21C moves the pusher 21A and the lifting and rotating portion 21B horizontally along the rail 21D. The rail 21D is formed so as to extend in the Y-direction (see FIG. 1). The rotation driving portion 20D, the lifting and rotating portion 21B, and the horizontally moving portion 21C each include an electric motor.

Description is now made of operation of the posture turning unit 20 and the pusher mechanism 21. With the posture turning unit 20 and the pusher mechanism 21, fifty substrates W in two carriers C, for example, are aligned at a predetermined pitch (e.g., at a half pitch of 5 mm) in a face-to-face system. The pusher mechanism 21 delivers the fifty substrates W to a first transport mechanism WTR1 arranged in a fourth line R4 in the treating block 9 at a substrate deliver position (a position P of the pusher mechanism 21 illustrated by dotted lines in FIG. 1) defined within the transferring block 7. Twenty-five substrates W in a first carrier C are to be described as substrates W1 in a first substrate group. Twenty-five substrates W in a second carrier C are to be described as substrates W2 in a second substrate group. It should be noted that, in FIGS. 3A to 3F, the number of substrates W1 in the first substrate group is three, and the number of substrates W2 in the second substrate group is three for convenience of illustration. Moreover, when no particular distinction is made between the substrate W1 and the substrate W2, the substrate W1 and the substrate W2 are described as a "substrate W".

Reference is made to FIG. 3A. The posture turning unit 20 receives the twenty-five substrates W1 in the first substrate group, that are transported from the collective transport mechanism HTR, with the holders 20B, 20C. At this time, the twenty-five substrates W1 are in a horizontal posture, and device faces thereof are directed upward. Here, a direction of the device face is denoted by an arrow AR. The twenty-five substrates W1 are arranged at a predetermined pitch (e.g., 10 mm). The pitch of 10 mm is called a full pitch or a normal pitch.

Here, a half pitch is half the full pitch. Moreover, the device face of the substrate W (W1, W2) is a face where electronic circuits are formed, and is called a "front face". Moreover, a back face of the substrate W is a face where no electronic circuits are formed. A face opposite to the device face corresponds to the back face.

Reference is made to FIG. 3B. The posture turning unit 20 rotates the holders 20B, 20C by 90 degrees around a horizontal axis AX2 to turn a posture of the twenty-five substrates W1 from horizontal to vertical. Reference is made to FIG. 3C. The pusher mechanism 21 moves the pusher 21A upward to a position higher than the holders 20B, 20C of the posture turning unit 20. Accordingly, the pusher 21A receives the twenty-five substrates W1 from the holders 20B, 20C. The twenty-five substrates W1 held by the pusher 21A are directed leftward Y.

Reference is made to FIG. 3D. The pusher mechanism 21 rotates the twenty-five substrates W1 in the vertical posture by 180 degrees around the vertical axis AX3. Accordingly, the twenty-five substrates W1 are reversed to be directed rightward Y. Moreover, the reversed twenty-five substrates W1 are moved leftward Y from a position before the reverse by a half pitch (e.g., 5 mm). Moreover, the holders 20B, 20C of the posture turning unit 20 are rotated by −90 degrees around the horizontal axis AX2 such that next substrates W2 are receivable. Thereafter, the posture turning unit 20 receives the twenty-five substrates W2 in the second substrate group, that are transported by the collective transport mechanism HTR, with the holders 20B, 20C. At this time, the twenty-five substrates W2 are in a horizontal posture, and device faces thereof are directed upward. Here, the posture turning unit 20 and the pusher mechanism 21 operate so as not to interfere each other.

Reference is made to FIG. 3E. The pusher mechanism 21 moves downward the pusher 21A, holding the twenty-five substrates W1 in the first substrate group, to a retreating position. Thereafter, the posture turning unit 20 turns a posture of the twenty-five substrates W2 from horizontal to vertical. The twenty-five substrates W2 whose posture is turned are directed leftward Y. Reference is made to FIG. 3F. Thereafter, the pusher mechanism 21 moves upward the pusher 21A, holding the twenty-five substrates W2 in the second substrate group. Accordingly, the pusher mechanism 21 also receives the twenty-five substrates W2 from the posture turning unit 20.

Accordingly, the pusher 21A holds fifty substrates W (W1, W2) in the first substrate group and the second substrate group. For the fifty substrates W, the twenty-five substrates W1 and the twenty-five substrates W2 are alternately arranged one by one. The fifty substrates W are arranged at a half pitch (e.g., 5 mm). Moreover, the twenty-five substrates W1 are directed in a reverse direction to the twenty-five substrates W2. Consequently, the fifty substrates W are arranged in a face-to-face system. That is, for adjacent two substrates W1, W2, two device faces thereof (or two back faces) face each other.

Thereafter, the pusher mechanism 21 moves the pusher 21A, holding the fifty substrates W, below one-paired chucks 23, mentioned later, of the first transport mechanism WTR1 (substrate deliver position P) along the rail 21D.

Reference is made again to FIG. 1. The first transport mechanism WTR1 is located in the fourth line R4 of the treating block 9. The first transport mechanism WTR1 moves in the front-back direction X within the fourth line R4. A front end of the fourth line R4 extends to the substrate deliver position P of the transferring block 7. The first transport mechanism WTR1 includes the one-paired chucks 23 configured to transport a plurality of (e.g., fifty) substrates W. The two chucks 23 each include two rotary shafts, respectively, that are directed in the transverse direction Y, for example. The two chucks 23 each swing around the two rotary shafts. The two chucks 23 grip both end faces of the substrates W in the vertical posture. The first transport mechanism WTR1 receives the substrates W in the vertical posture from the pusher 21A. The first transport mechanism WTR1 delivers a plurality of untreated substrates W to batch processing units BPU1 to BPU3 of the treating block 9.

5. Treating Block

The treating block 9 performs treatment on the substrates W. The treating block 9 is divided into a first line R1, a second line R2, a third line R3, and a fourth line R4 in the transverse direction Y. Specifically, the first line R1 and the fourth line R4 are arranged leftward Y side by side. The second line R2 is arranged in the middle in the transverse direction Y. In other words, the second line R2 is arranged rightward Y of the first line R1. The third line R3 is arranged rightward Y of the second line R2. The following describes configurations of the lines R1 to R4.

5-1. First Line

The first line R1 is a batch treatment region, and mainly includes a batch-type processing unit (hereafter, referred to as a "batch processing unit"). Specifically, the first line R1 includes a first batch processing unit BPU1, a second batch processing unit BPU2, a third batch processing unit BPU3, and an underwater posture turning unit 24. The three batch processing units BPU1 to BPU3 each perform treatment on a plurality of (e.g., fifty) substrates W collectively. Here, the substrates W treated collectively by each of the batch processing units BPU1 to BPU3 are called a treatment substrate group.

The first batch processing unit BPU1 adjoins rearward X of the transferring block 7. The second batch processing unit BPU2 adjoins rearward X of the first batch processing unit BPU1. The third batch processing unit BPU3 adjoins rearward X of the second batch processing unit BPU2. The underwater posture turning unit 24 adjoins rearward X of the third batch processing unit BPU3.

The first batch processing unit BPU1 is, for example, a chemical processing unit CHB1. The chemical processing unit CHB1 performs phosphoric acid treatment, for example. In the phosphoric acid treatment, phosphoric acid is used for a treatment liquid. In the phosphoric acid treatment, etching treatment is performed on a plurality of substrates. In the etching treatment, a coated film deposited on the substrate W is chemically ground. The coating is, for example, nitride film.

The chemical processing unit CHB1 includes a process tank 26A and a lifter LF1. The process tank 26A stores a treatment liquid. The process tank 26A supplies the treatment liquid upward from the below, for example. The lifter LF1 moves upward and downward in the vertical direction Z. Specifically, the lifter LF1 moves upward and downward between a treating position inside of the process tank 26A and a deliver position above the process tank 26A. The lifter LF1 holds a plurality of substrates W in a vertical posture. The lifter LF1 delivers the substrates W at the deliver position to and from the first transport mechanism WTR1.

The second batch processing unit BPU2 is, for example, a chemical processing unit CHB2. The chemical processing unit CHB2 has a configuration similar to that of the chemical processing unit CHB1. That is, the chemical processing unit CHB2 includes another process tank 26B and a lifter LF2. The chemical processing unit CHB2 performs treatment similar to that performed by the chemical processing unit CHB1. That is, there are a plurality of processing units that perform the same chemical treatment. This is because a longer period of time is needed for phosphoric acid treatment than the other chemical treatment and the deionized water cleaning treatment. For example, it takes around sixty minutes to perform the phosphoric acid treatment. Accordingly, the phosphoric acid treatment is performed in the plurality of chemical processing units simultaneously, leading to enhanced throughput. The lifter LF2 is configured in the same manner as the lifter LF1.

The third batch processing unit BPU3 is, for example, a deionized water processing unit ONB. The deionized water processing unit ONB includes a configuration similar to those of the chemical processing units CHB1 and CHB2. That is, the deionized water processing unit ONB includes a process tank 26C and a lifter LF3. However, the process tank 26C mainly supplies deionized water for deionized water cleaning treatment with use of jet pipes 145 (see FIG. 12A) mentioned later. The jet pipe 145 is configured in the same manner as a jet pipe 73A mentioned later. The process tank 26C stores deionized water. The process tank 26C cleans the substrates W to which a chemical is adhered. In other words, the process tank 26C of the deionized water processing unit ONB cleans off the chemical adhered to the substrates W. When specific resistance of the deionized water in the process tank 26C increases to a given value, the deionized water processing unit ONB stops the cleaning treatment, for example.

The lifter LF3 is configured in the same manner as the lifters LF1, LF2. Specifically, the lifter LF3 includes a substrate holder 27 and a lifting mechanism 28 (see FIGS. 1 and 12C). The substrate holder 27 holds a plurality of substrates W (treatment substrate group) aligned in a vertical posture at a given pitch (e.g., half pitch of 5 mm). The lifting mechanism 28 moves the substrate holder 27 upward and downward. The lifting mechanism 28 includes an electric motor or an air cylinder.

Here, deionized water that the deionized water processing unit ONB supplies corresponds to the rinse liquid in the present invention. The process tank 26C corresponds to the rinse tank in the present invention. Moreover, the substrate holder 27 of the lifter LF3 corresponds to the vertical substrate holder in the present invention. The lifting mechanism 28 of the lifter LF3 corresponds to part or the entire of the relative lifting and lowering unit in the present invention.

5-2. Second Line

The second line R2 is a single substrate transport region, and includes a center robot CR. The center robot CR includes a hand 29. The hand 29 holds one substrate W in a horizontal posture. The center robot CR may adopt a configuration, for example, that includes another hand 29 in the vertical direction Z. The center robot CR is configured to be movable in the front-back direction X. The center robot CR is configured to be movable upward and downward in the vertical direction Z. The center robot CR is configured in such a manner as to be turnable in a horizontal plane including the front-back direction X and the transverse direction Y. The hand 29 is configured in such a manner as to be able to advance and withdraw in a horizontal plane including the front-back direction X and the transverse direction Y.

The hand 29 receives the substrates W one by one from the underwater posture turning unit 24. The center robot CR delivers the substrates W one by one to the third line R3. That is, the center robot CR takes one substrate W from each of the first substrate group (substrates W1) and the second substrate group (substrates W2) whose postures are turned to horizontal by the underwater posture turning unit 24, and transports the substrate W1 (W2) to either single-wafer treatment unit SWP1 or SWP2, mentioned later. Now, when the center robot CR includes two hands 29, the hands 29 may receive two substrates W collectively from the underwater posture turning unit 24, and deliver the substrates W one by one to two locations, i.e., two single-wafer processing unit SWP1 and SWP2, respectively, mentioned later. The center robot CR corresponds to the horizontal substrate transporting robot in the present invention.

5-3. Third Line

The third line R3 is a single-wafer treatment region, and mainly includes a single-wafer-type processing unit (hereafter, referred to as a "single-wafer processing unit"). Specifically, the third line R3 includes a first single-wafer processing unit SWP1, a second single-wafer processing unit SWP2, a third single-wafer processing unit SWP3, and a buffer unit 31. The three single-wafer processing units SWP1 to SWP3 perform treatment on the substrates W one by one. The first single-wafer processing unit SWP1 is arranged at the innermost side in the front-back direction X. In other words, the first single-wafer processing unit SWP1 is arranged opposite to the underwater posture turning unit 24 across the second line R2 in the transverse direction Y. The second single-wafer processing unit SWP2 adjoins forward X of the first single-wafer processing unit SWP1. The third single-wafer processing unit SWP3 adjoins forward X of the second single-wafer processing unit SWP2. The buffer unit 31 adjoins forward X of the third single-wafer processing unit SWP3 and rearward X of the collective transport mechanism HTR.

The first single-wafer processing unit SWP1 and the second single-wafer processing unit SWP2 each include, for example, a rotating unit 33 and a nozzle 35. The rotating unit 33 includes a spin chuck configured to hold the substrates W in a horizontal posture, and an electric motor configured to rotate the substrates W around a vertical axis passing through the center of the substrates W. The nozzle 35 supplies a treatment liquid to the substrate W held by the rotating unit 33. The nozzle 35 swings between a standby position apart from the rotating unit 33 and a supply position above the rotating unit 33. The treatment liquid is, for example, isopropyl alcohol (IPA) or deionized water. The first single-wafer processing unit SWP1 and the second single-wafer processing unit SWP2 may each perform cleaning treatment on the substrates W with deionized water, and then perform preliminary dry treatment with IPA, or may form an IPA liquid film on top faces of the substrates W, for example.

The third single-wafer processing unit SWP3 includes, for example, a supercritical fluid chamber 37. The supercritical fluid chamber 37 performs dry treatment with supercritical fluid, for example. The fluid used at this time is, for example, carbon dioxide. The supercritical fluid chamber 37 performs treatment on the substrate W with the treatment liquid under a supercritical state. The supercritical state is obtained by bring fluid into critical temperature and pressure inherent in the fluid. Specifically, when the fluid is carbon dioxide, a critical temperature is 31 degrees Celsius and critical pressure is 7.38 MPa. Under the supercritical state, the fluid has a surface tension of approximately zero. Accordingly, patterns of the substrateW are not affected by a gas-liquid interface. Consequently, pattern collapse is unlikely to occur in the substrate W.

The buffer unit 31 includes, for example, a plurality of steps of mount shelves 39. The plurality of steps of mount shelves 39 are preferably stacked in the vertical direction Z.

At least one lot of (e.g., twenty-five) substrates W can be placed on the plurality of steps of mount shelves 39. Since the collective transport mechanism HTR can take out the plurality of (e.g., twenty-five) substrates W collectively, the collective transport mechanism HTR has lower load than the case where the first transport mechanism HTR takes out the substrates W one by one. The buffer unit 31 is accessible from different horizontal directions. The center robot CR accesses the buffer unit 31 from the second line R2 toward rightward Y to place the substrates W. The collective transport mechanism HTR accesses the buffer unit 31 from frontward X to rearward X to receive one lot of the substrates W collectively. The collective transport mechanism HTR can also receive less than one lot of the substrates W. The center robot CR described above moves upward and downward among the mount shelves 39 in the vertical direction Z to deliver the substrates W.

It is preferable that, in the first single-wafer processing unit SWP1, the second single-wafer processing unit SWP2, and the third single-wafer processing unit SWP3, the processing units likewise are stacked in multiple steps in the vertical direction Z. This achieves enhanced throughput.

5-4. Fourth Line

The fourth line R4 is a collective substrate transport region, and has the first transport mechanism WTR1 and the second transport mechanism WTR2 arranged therein. Description of the configuration of the first transport mechanism WTR1 is omitted since it is made in detail previously. The following describes the second transport mechanism WTR2.

The treating block 9 further includes the second transport mechanism (robot) WTR2. That is, the substrate treating apparatus 1 includes the second transport mechanism WTR2 in addition to the first transport mechanism WTR1. As shown in FIG. 1, the first transport mechanism WTR1 transports fifty substrates W, for example, in the vertical posture between the pusher 21A and the three lifters LF1 to LF3. For example, the first transport mechanism WTR1 can collectively transport fifty substrates W (treatment substrate group) to the substrate holder 27 of the lifter LF3.

In contrast to this, the second transport mechanism WTR2 transports twenty-five substrates W1 (W2), for example, in the vertical posture between the lifter LF3 and a pusher 75 mentioned later. Moreover, the second transport mechanism WTR2 pull out a plurality of (e.g., twenty-five) substrates W1 (W2), for example, from the fifty substrates (treatment substrate group), held by the substrate holder 27 of the lifter LF3, by two times. That is, the second transport mechanism WTR2 can pull out and transport either twenty-five substrates W with odd numbers or twenty-five substrates W with even numbers from fifty substrates W selectively. Then, the second transport mechanism WTR2 transports the twenty-five substrates W1 in the first substrate group and the twenty-five substrates W2 in the second substrate group individually that are pulled out by two times.

The first transport mechanism WTR1 corresponds to the upstream vertical substrate transporting robot in the present invention. The second transport mechanism WTR2 corresponds to the vertical substrate transporting robot in the present invention.

Figure 4A:
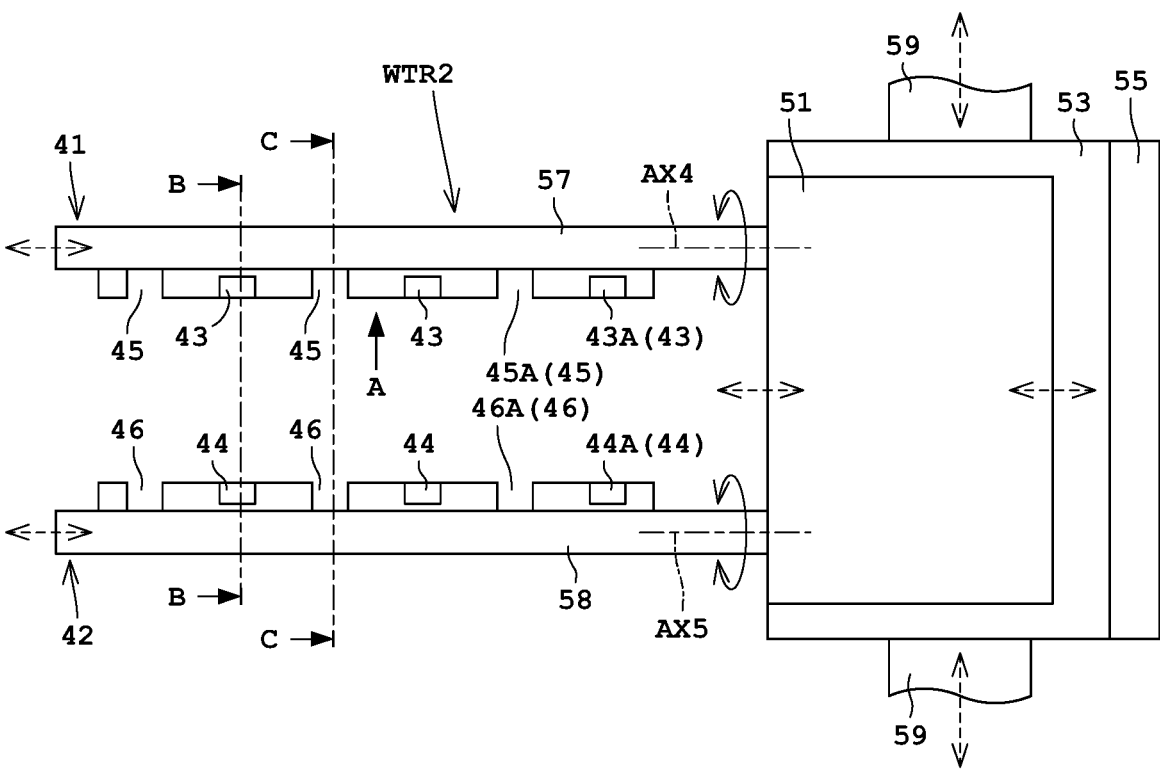
FIG. 4A is a plan view of a second transport mechanism.
Figure 4B:
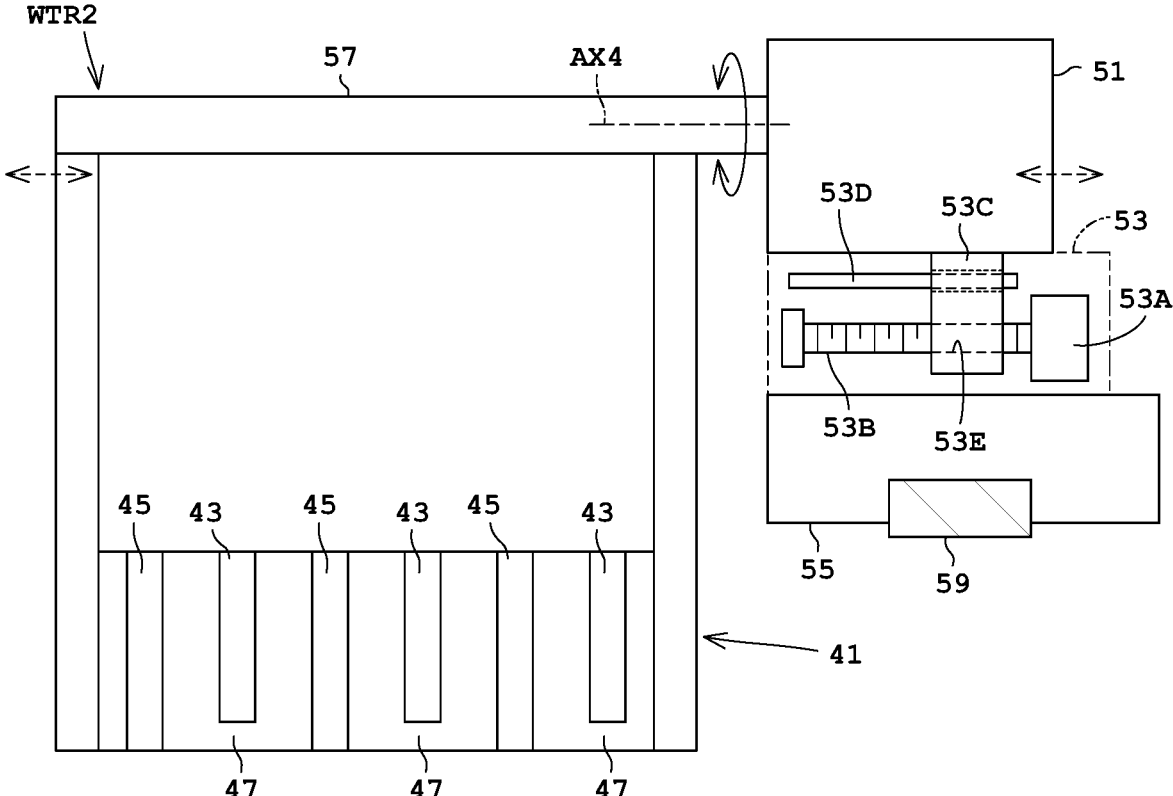
FIG. 4B is a side view of a swing unit, a substrate alignment direction moving unit, a tank-to-tank moving unit, and a chuck seen from an arrow A in FIG. 4A.
Figure 5A:
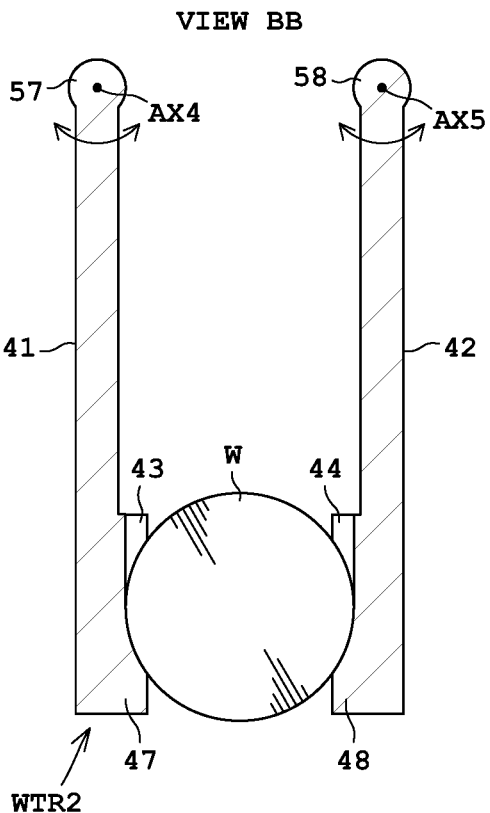
FIG. 5A is a longitudinal sectional view of one-paired holding grooves seen from an arrow BB in FIG. 4A.

FIG. 4A is a schematical plan view of the second transport mechanism WTR2. FIG. 4B is a side view of one chuck 41 seen from an arrow A in FIG. 4A. FIG. 5A is a longitudinal sectional view of holding grooves 43, 44 of one-paired chucks 41, 42, respectively, seen from an arrow BB in FIG.

Figure 5B:
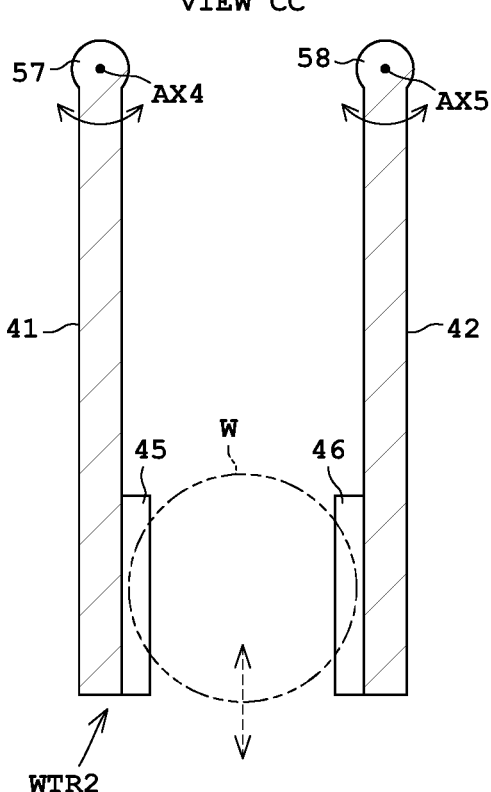
FIG. 5B is a longitudinal sectional view of one-paired passing grooves seen from an arrow CC in FIG. 4A.

4A. FIG. 5B is a longitudinal sectional view of passing grooves 45, 46 of the one-paired chucks 41, 42, respectively, seen from an arrow CC in FIG. 4A.

The second transport mechanism WTR2 includes one-paired chucks 41, 42. The chucks 41, 42 have one-paired holding grooves 43, 44 and one-paired passing grooves 45, 46 formed at an equal interval alternately and successively. The one-paired chucks 41, 42 are configured to grip two sides of each outer edge of the substrates W (treatment substrate group). The plural-paired holding grooves 43, 44 and the plural-paired passing grooves 45, 46 are alternately arranged one by one in the direction Y where the plurality of substrates W are aligned. A gap between one-paired holding grooves 43, 44 and one-paired passing grooves 45, 46 is equal to an alignment pitch (here, half pitch of 5 mm, for example) of the plurality of substrates W subjected to batch treatment.

The number of the one-paired holding grooves 43, 44 is twenty-five pairs, for example. Moreover, the number of the one-paired passing grooves 45, 46 is twenty-five pairs, for example. In this case, the first chuck 41 is provided with twenty-five holding grooves 43 and twenty-five passing grooves 45. Moreover, the second chuck 42 is provided with twenty-five holding grooves 44 and twenty-five passing grooves 46. Moreover, as shown in FIG. 4B, the holding grooves 43 and passing grooves 45 are alternately arranged in the first chuck 41.

The one-paired holding grooves 43, 44 face each other. As shown in FIG. 4A, the one-paired holding grooves 43A, 44A face each other, for example. The one-paired holding grooves 43, 44 each hold one substrate W in the vertical posture. As shown in FIG. 5A, the one-paired holding grooves 43, 44 have projection portions 47, 48, respectively, for holding one substrate W in the vertical posture.

The one-paired passing grooves 45, 46 face each other. As shown in FIG. 4A, the one-paired passing grooves 45A, 46A face each other. The one-paired passing grooves 45, 46 each pass one substrate W in the vertical posture. That is, the one-paired passing grooves 45, 46 cannot hold one substrate W in the vertical posture. As shown in FIGS. 5A and 5B, the one-paired passing grooves 45, 46 does not include two projection portions 47, 48, respectively, like the one-paired holding grooves 43, 44.

Moreover, as shown in FIG. 4A, the second transport mechanism WTR2 includes a swing unit 51, a substrate alignment direction moving unit 53, and a tank-to-tank moving unit 55. The swing unit 51 includes a first horizontal shaft 57 provided at an upper end of the first chuck 41, a second horizontal shaft 58 provided at an upper end of the second chuck 42, and one or more electric motors not shown. The swing unit 51 rotates the first chuck 41 around a horizontal axis AX4 of the first horizontal shaft 57, and simultaneously rotates the second chuck 42 around a horizontal axis AX5 of the second horizontal shaft 58. Accordingly, the chucks 41, 42 grip the plurality of substrates W and release gripping of the plurality of substrates W.

Here, the two chucks 41, 42 each rotate around the horizontal axes AX4, AX5, respectively, so as to grip the plurality of substrates W. In this regard, the two chucks 41, 42 may move so as to be apart from each other or to be close to each other.

The substrate alignment direction moving unit 53 moves the chucks 41, 42 and the swing unit 51 horizontally in the Y-direction along at least one of the two horizontal shafts 57, 58 extending in the Y-direction where the substrates W are aligned. The substrate alignment direction moving unit 53 includes an electric motor 53A, a threaded shaft (screw shaft) 53B, a slider 53C, and a guide rail 53D, for example. The slider 53C is coupled to the swing unit 51. The threaded shaft 53B passes through a nut 53E of the slider 53C while the nut 53E engages with the threaded shaft 53B. When the threaded shaft 53B is rotated around an axis with the electric motor 53A, the slider 53C is moved in the Y-direction. This causes the two chucks 41, 42, and the swing unit 51 to move in the Y-direction.

Moreover, the substrate alignment direction moving unit 53 can move the two chucks 41, 42 between a first holding position and a second holding position. The first holding position is a position where twenty-five paired holding grooves 43, 44 can hold twenty-five substrates W1 in the first substrate group, for example. Moreover, the second holding position is a position where one-paired twenty-five holding grooves 43, 44 can hold twenty-five substrates W2 in the second substrate group. The first holding position and the second holding position are shifted by a half pitch (e.g., 5 mm).

The tank-to-tank moving unit 55 moves the chucks 41, 42, the swing unit 51, and the substrate alignment direction moving unit 53 horizontally in an X-direction along the guide rail 59 extending in the X-direction where three process tanks 26A, 26B, 26C are aligned. Accordingly, twenty-five substrates W1 (W2), for example, in the vertical posture can be transported between the lifter LF3 of the third batch processing unit BPU3 and the pusher 75 of the underwater posture turning unit 24 mentioned later.

6. Underwater Posture Turning Unit

Figure 6:
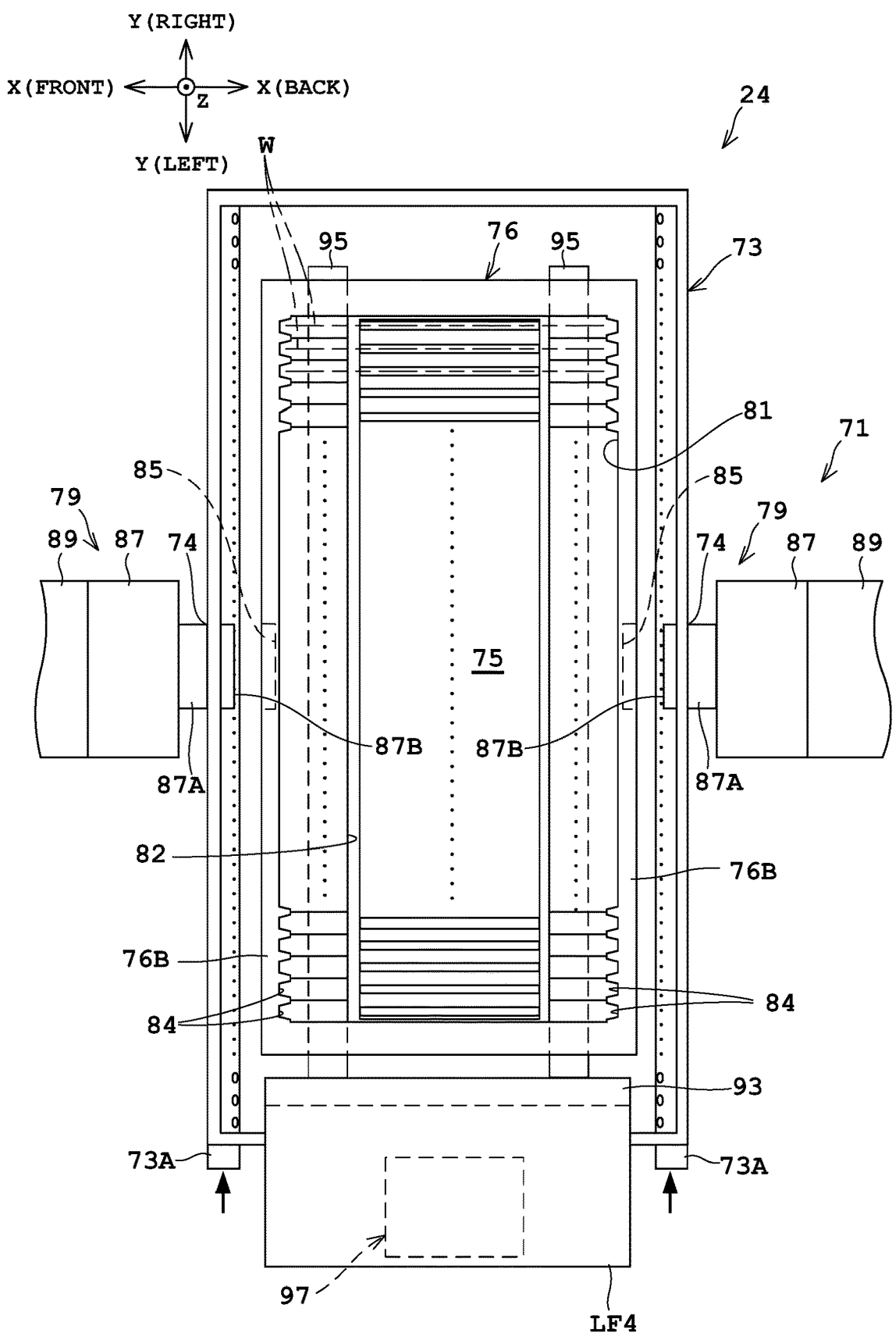
FIG. 6 is a plan view of an underwater posture turning unit.
Figure 7:
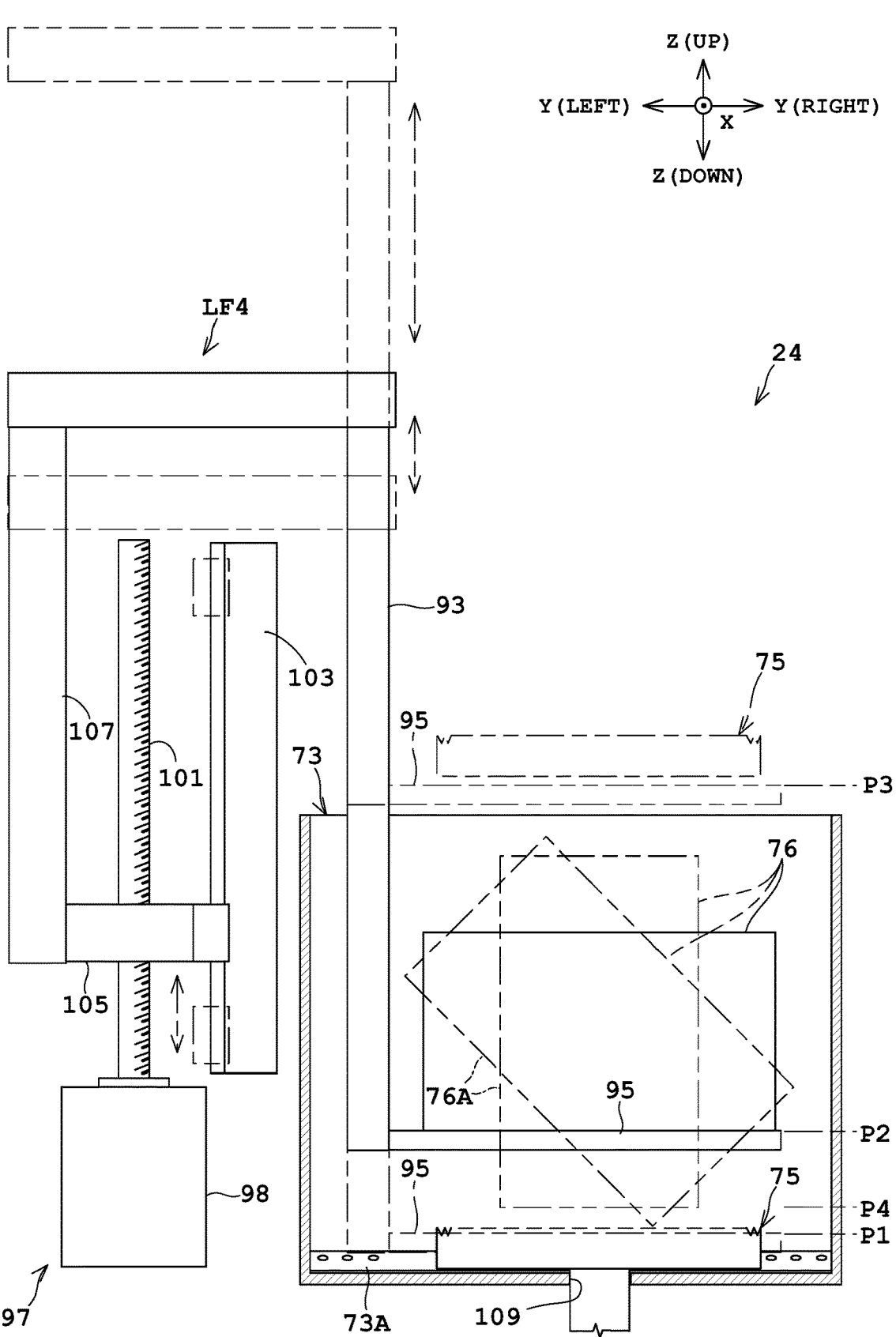
FIG. 7 is a side view of the underwater posture turning unit.
Figure 8:
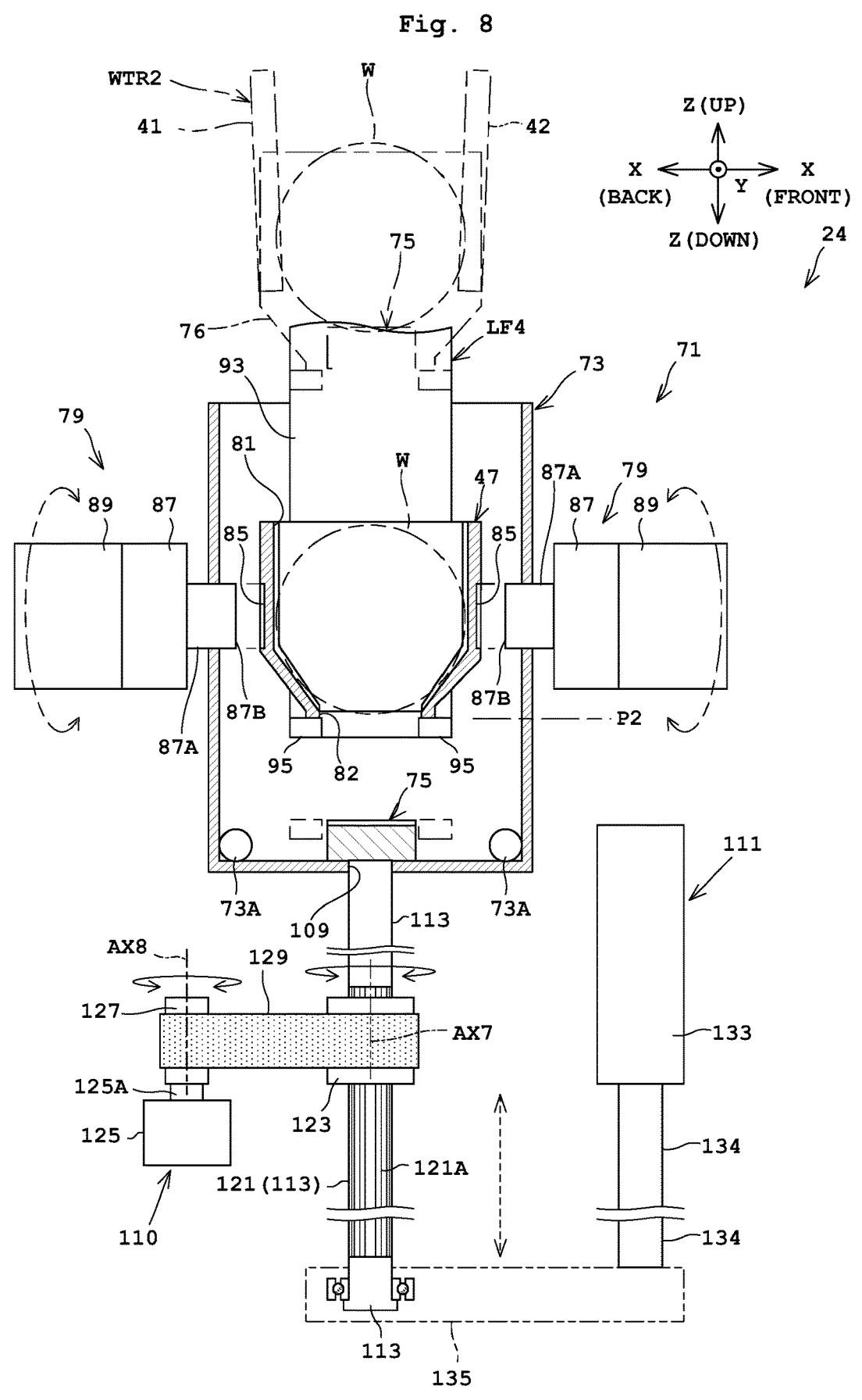

The following describes the underwater posture turning unit 24 with reference to FIGS. 6 to 8. FIG. 6 is a plan view of the underwater posture turning unit 24. FIG. 7 is a side view of the underwater posture turning unit 24. FIG. 8 is a front view of the underwater posture turning unit 24.

The underwater posture turning unit 24 collectively turn each posture of the first substrate group (substrates W1) and the second substrate group (substrates W2), transported by the second transport mechanism WTR2, from vertical to horizontal collectively. The underwater posture turning unit 24 includes a posture turning unit 71, an immersion tank 73, a lifter LF4, and a pusher 75. The posture turning unit 71 includes an in-tank carrier 76 and a rotating mechanism (carrier rotating mechanism) 79.

The in-tank carrier 76 can accommodate fifty substrates W, for example, in the vertical posture. In this case, the in-tank carrier 76 separates and accommodates the fifty substrates W at given intervals along a given alignment direction. An alignment direction of the substrates W is orthogonal to a direction of the device face. The alignment direction corresponds to a thickness direction of the substrate W. Here, the in-tank carrier 76 may also accommodate twenty-five substrates W, for example.

The in-tank carrier 76 has a front opening 81, a back opening 82, a plurality of (e.g., fifty) substrate holding grooves 84 each of which is paired, a back wall 76a (see FIG. 15B), two side walls 76B, and an engaging portion 85. Detailed description is as under.

The in-tank carrier 76 has the front opening 81 formed at a top face thereof. The in-tank carrier 76 has the back opening 82 formed at the bottom thereof. The front opening 81 is used to pass thorough the substrates W, for example. The front opening 81 has a length in the front-back direction X longer than a diameter of the substrate W. The back opening 82 is narrower (smaller) than the front opening 81 in its opening area. Accordingly, the back opening 82 is configured not to pass the twenty-five substrates W individually. The back wall (bottom wall) 76A where the back opening 82 is formed faces the front opening 81. That is, the back opening 82 faces the front opening 81.

In FIG. 6, plural-paired (fifty paired) substrate holding grooves 84 are arranged in the Y-direction at a half pitch (e.g., a pitch of 5 mm). These substrate holding grooves 84 can hold the fifty substrates W arranged at a half pitch. The plural-paired substrate holding grooves 84 are provided in the two side walls 76B. Each paired substrate holding grooves 84 are arranged so as to face each other. Here in this embodiment, while the in-tank carrier 76 can accommodate the fifty substrates W, the in-tank carrier 76 accommodates twenty-five substrates W1 (W2) of the fifty substrates W transported by the second transport mechanism WTR2.

The engaging portions 85 are formed in two outer surfaces of the two side walls 76B in the in-tank carrier 76 in the front-back direction X. The engaging portions 85 are formed in outer surfaces orthogonal to the alignment direction of the substrates W.

The immersion tank 73 accommodates the in-tank carrier 76 and two supporting portions 95 mentioned later. The immersion tank 73 stores deionized water as an immersion liquid. The immersion tank 73 includes jet pipes 73A at both sides of the bottom face thereof in the front-back direction X. The jet pipes 73A each have a tubular shape. The jet pipes 73A each have a long shaft in the transverse direction Y. The jet pipes 73A are each long in the transverse direction Y. The jet pipes 73A each supply deionized water to a center part of the immersion tank 73 in the front-back direction X. The jet pipes 73A each form an upward flow of the deionized water flowing upward from the bottom of the immersion tank 73. The deionized water supplied into the immersion tank 73 from the jet pipes 73A is discharged over an upper edge of the immersion tank 73.

The rotating mechanism 79 rotates the in-tank carrier 76, immersed in the deionized water within the immersion tank 73, for collectively turning each posture of the first substrate group (substrates W1) and the second substrate group (substrates W2) around the horizontal axis. The rotating mechanism 79 includes an air cylinder 87 and a motor (electric motor) 89. The air cylinder 87 includes an operating shaft 87A and an engaging piece 87B. The operating shaft 87A advances and withdraws in the front-back direction X in response to on-off of the air cylinder 87. The immersion tank 73 has through holes 74 formed therein. The through holes 74 are formed in each of the two side walls of the immersion tank 73 in the front-back direction X. The operating shaft 87A is attached to the through hole 74 of the immersion tank 73 in a liquid-tight manner. The operating shaft 87A can advance and withdraw in the front-back direction X in the liquid-tight manner. The operating shaft 87A can rotate around an axis in the front-back direction X in the liquid-tight manner. In other words, the operating shaft 87A can advance and withdraw and can also rotate relative to the center part of the immersion tank 73 in a maintained liquid-tight manner.

An advancing position of the engaging piece 87B of the operating shaft 87A for engaging the engaging portion 85 is a connecting position. A retracted position of the engaging piece 87B of the operating shaft 87A for spacing apart from the engaging portion 85 is an opened position. The operating shaft 87A shown in FIG. 6 is located while the engaging piece 87B thereof is in the opened position.

The engaging piece 87B engages with the engaging portion 85 of the in-tank carrier 76. The engaging piece 87B has a shape (contour) of an outer circumferential surface so as to engage with the engaging portion 85. The engaging portion 85 and the engaging piece 87B each have a polygon shape seen from the front-back direction X, for example. The engaging piece 87B is slightly smaller than the engaging portion 85 in dimension in the cross-sectional shape. An inner circumferential surface shape of the engaging portion 85 is similar to an outer circumferential surface of the engaging piece 87B. The in-tank carrier 76 is integrated with the operating shaft 87A while the engaging piece 87B engages with the engaging portion 85. In other words, the in-tank carrier 76 is rotatable around the axis in the front-back direction X together with the operating shaft 87A while the engaging piece 87B engages with the engaging portion 85.

When the air cylinder 87 turns on, the operating shaft 87A advances, for example. When the air cylinder 87 turns off, the operating shaft 87A withdraws, for example. When the air cylinder 87 turns on, the engaging piece 87B moves to the connecting position where the engaging piece 87B engages with the engaging portion 85. When the air cylinder 87 turns off, the engaging piece 87B moves to the opened position where the engaging piece 87B is spaced apart from the engaging portion 85. In the connecting position, the operating shaft 87A is integrated with the in-tank carrier 76. In the opened position, the operating shaft 87A is separated from the in-tank carrier 76.

The motor 89 rotates the air cylinder 87 around the axis in the front-back direction X. When the air cylinder 87 turns on and the motor 89 rotates in a first direction, the motor 89 causes the in-tank carrier 76 to rotate in a forward direction around the axis in the front-back direction X. When the air cylinder 87 turns on and the motor 89 rotates in a second direction reverse to the first direction, the motor 89 causes the in-tank carrier 76 to rotate reversely around the axis in the front-back direction X. Rotation angles at this time are each around 90 degrees (absolute value). The rotation angles at this time correspond to rotation angles where a posture of the substrates W accommodated in the in-tank carrier 76 turns to a horizontal posture and a vertical posture.

As illustrated in FIGS. 6 and 7, the lifter LF4 includes a back plate 93 and two supporting portions 95. The back plate 93 extends along an inner surface of the immersion tank 73 in the vertical direction Z. For example, the two supporting portions 95 are attached to a lower end of the back plate 93. The two supporting portions 95 extends in the transverse direction Y. The two supporting portions 95 have a gap in the front-back direction X larger than the back opening 82. The lifter LF4 supports the in-tank carrier 76 such that a longitudinal direction of the in-tank carrier 76 is made horizontal. That is, the two supporting portions 95 of the lifter LF4 support the in-tank carrier 76 whose front opening 81 is directed upward.

A lifting mechanism 97 is located near the lifter LF4. The lifting mechanism 97 moves the two supporting portions 95 and the like upward and downward. The lifting mechanism 97 includes a motor (electric motor) 98, a threaded shaft 101, a linear guide 103, and a lifting piece 105. The motor 98 is located in a posture where the rotary shaft faces in a longitudinal direction. The threaded shaft 101 is attached to the rotary shaft of the motor 98. The threaded shaft 101 faces in the vertical direction Z. The linear guide 103 is provided parallel to the threaded shaft 101. The linear guide 103 faces in the vertical direction Z. The lifting piece 105 is screwed on the threaded shaft 101. One end of the lifting piece 105 is slidably attached to the linear guide 103. The other of the lifting piece 105 is attached to a connecting member 107.

The connecting member 107 has an inverted L-shape. The connecting member 107 is coupled to an upper end of the back plate 93.

When the motor 98 is actuated, the threaded shaft 101 is rotated. When the threaded shaft 101 is rotated, the lifting piece 105 is moved upward and downward in the vertical direction Z along the linear guide 103 in response to a rotation direction of the motor 98. This causes the lifter LF4 to move the two supporting portions 95 upward and downward to a plurality of height positions, for example.

The underwater posture turning unit 24 corresponds to the posture turning unit in the present invention. The lifter LF4 corresponds to the carrier lifter in the present invention. The supporting portion 95 corresponds to the carrier supporting portion in the present invention. The lifting mechanism 97 corresponds to the carrier lifting mechanism in the present invention. The rotating mechanism 79 corresponds to the carrier rotating mechanism in the present invention. The operating shaft 87A and the engaging piece 87B correspond to the shaft in the present invention. The motor 89 corresponds to the rotation driving unit in the present invention.

For example, as shown in FIG. 7, the lifting mechanism 97 causes the supporting portions 95 of the lifter LF4 to move upward and downward among a first height position P1, a second height position P2, a third height position P3, and a fourth height position P4. The fourth height position P4 is higher than the first height position P1. The second height position P2 is higher than the fourth height position P4. The third height position P3 is higher than the second height position P2.

When the supporting portions 95 of the lifter LF4 are located at the first height position P1, the supporting portions 95 are positioned near the bottom face of the immersion tank 73. When the supporting portions 95 are located at the first height position P1, the rotating mechanism 79 grips the in-tank carrier 76 and the supporting portions 95 are moved apart from the lower face of the in-tank carrier 76. When the supporting portions 95 are located at the first height position P1, the rotating mechanism 79 can rotate the in-tank carrier 76 vertically in the immersion tank 73 in the longitudinal direction.

When the supporting portions 95 of the lifter LF4 are located at the second height position P2, the in-tank carrier 76 is entirely positioned below a liquid level of the immersion tank 73 and the front opening 81 of the in-tank carrier 76 is positioned below the liquid level. When the supporting portions 95 are located at the second height position P2, the rotating mechanism 79 can grip the in-tank carrier 76 whose front opening 81 is directed upward. When the supporting portions 95 are located at the second height position P2, the engaging portion 85 of the in-tank carrier 76 and the engaging piece 87B of the air cylinder 87 are aligned linearly in the horizontal direction, and the engaging portion 85 and the engaging piece 87B face each other in the horizontal direction.

When the supporting portions 95 of the lifter LF4 are located at the third height position P3, the plurality of substrates W can be delivered between the in-tank carrier 76 and the pusher 75. When the supporting portions 95 are located at the third height position P3, the supporting portions 95 are positioned above the liquid level of the immersion tank 73, for example. However, the supporting portion 95 is not necessarily positioned above the liquid level since the bottom of the in-tank carrier 76 needs to be positioned above the liquid level.

When the supporting portions 95 of the lifter LF4 are located at the fourth height position P4, the in-tank carrier 76 having the plurality of substrates W in the horizontal posture is positioned below the liquid level of the immersion tank 73. The supporting portions 95 are shifted stepwise from the fourth height position P4 to the third height position P3. The supporting portions 95 are shifted stepwise, whereby only substrates W to be transported by the center robot CR can be positioned above the liquid level of the immersion tank 73.

Reference is made to FIG. 8. A through hole 109 is formed in the bottom of the immersion tank 73. The underwater posture turning unit 24 includes a pusher rotating mechanism 110 and a pusher lifting mechanism 111 in addition to the pusher 75.

The pusher rotating mechanism 110 includes, for example, a vertical shaft 113 (including a spline 121), a spline nut 123, an electric motor 125, a pulley 127, and a belt 129. Moreover, the pusher lifting mechanism 111 includes, for example, a vertical shaft 113 (including a spline 121), a linear actuator 133, a movable member 134, and a lifting and lowering member 135. The vertical shaft 113 is shared by the pusher rotating mechanism 110 and the pusher lifting mechanism 111.

The vertical shaft 113 is inserted into the through hole 109 (see FIG. 8). The vertical shaft 113 is located so as to extend in the vertical direction. An upper end of the vertical shaft 113 is connected to the pusher 75. The spline 121 is formed at a lower part of the vertical shaft 113. The spline 121 is inserted into the spline nut 123. The spline 121 is movable upward and downward relative to the spline nut 123 along a vertical axis AX7. External teeth 121A formed on an outer circumferential face of the spline 121 mesh with internal teeth formed on an inner circumferential face of the spline nut 123. The spline 121 (vertical shaft 113) rotates around the vertical axis AX7 integrally with the spline nut 123.

The pulley 127 is connected to a rotation output shaft 125A of the electric motor 125. The belt 129 is hung over the pulley 127 and the spline nut 123. This transmits rotation of the rotation output shaft 125A around a vertical axis AX8 to the spline nut 123. Moreover, rotation of the spline nut 123 causes the spline 121 (vertical shaft 113) to rotate around the vertical axis AX7. The linear actuator 133 pushes out downward or pulls upward the movable member 134. The lifting and lowering member 135 is connected to a lower end of the movable member 134. Moreover, the lifting and lowering member 135 holds a lower end of the vertical shaft 113 such that the vertical shaft 113 is rotatable around the vertical axis AX7. The vertical shaft 113 moves upward and downward together with the lifting and lowering member 135. The linear actuator 133 includes an air cylinder or an electric motor.

When the electric motor 125 rotates the pulley 127, the pusher 75 rotates around the vertical axis AX7. Moreover, when the linear actuator 133 moves the lifting and lowering member 135 upward, the pusher 75 is moved upward. When the linear actuator 133 moves the lifting and lowering member 135 downward, the pusher 75 is moved downward.

When the front opening 81 of the in-tank carrier 76 is directed upward as shown in FIG. 8, the pusher 75 can pass through the two openings 81, 82 of the in-tank carrier 76. The pusher 75 can pass between the two supporting portions 95. Moreover, the pusher 75 can move upward and downward between a standby position and a receivable position. The standby position is a position adjacent to the bottom face of the immersion tank 73. The receivable position is a position above the immersion tank 73. When the pusher 75 is located at the receivable position, the pusher 75 is positioned above the liquid level of the immersion liquid in the immersion tank 73. The receivable position is a position where twenty-five substrates W are received from the second transport mechanism WTR2.

The pusher 75 includes a plurality of (e.g., fifty) holding grooves for holding the plurality of (e.g., fifty) substrates W from below. When the pusher 75 is changed from a state above the in-tank carrier 76 to a state below the in-tank carrier 76, the in-tank carrier 76 receives twenty-five substrates W1 (W2) from the pusher 75.

The substrate treating apparatus 1 includes a control unit 141 (see FIG. 1) and a memory unit (not shown). The control unit 141 controls components of the substrate treating apparatus 1. The control unit 141 includes one or more processors like a central processing unit (CPU). The memory unit includes, for example, at least one of a read-only memory (ROM), a random-access memory (RAM), and a hard disk. The memory unit stores computer programs necessary for controlling each component of the substrate treating apparatus 1.

Here, the collective transport mechanism HTR can transport twenty-five substrates W, but the number of substrates W that can be transported is not limited to twenty-five. For example, the number of substrates W that can be transported may be five. Moreover, the first transport mechanism WTR1 can transport fifty substrates W, but the number of substrates W that can be transported is not limited to fifty.

The second transport mechanism WTR2 can transport twenty-five substrates W, but the number of substrates W that can be transported is not limited to twenty-five. For example, the number of substrates W that can be transported may be twenty-six. In this case, one-paired chucks 41, 42 have twenty-six-paired holding grooves 43, 44, respectively.

7. Operation Explanation

Figure 9:
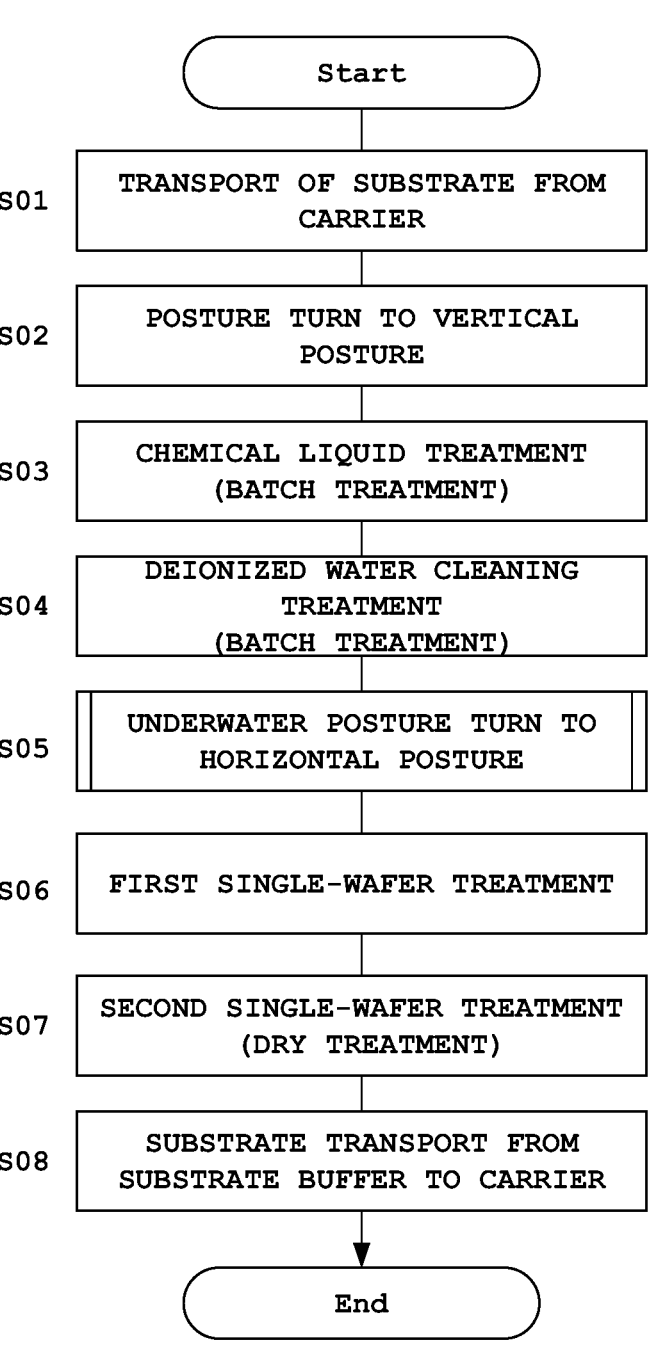
FIG. 9 is a flowchart illustrating operation of the substrate treating apparatus.

The following describes operation of the substrate treating apparatus 1. Reference is made to FIG. 1. An external transport robot, not shown, transports two carriers C into the loading unit 11 in order. FIG. 9 is a flowchart illustrating operation of the substrate treating apparatus 1. It should be noted that, in FIGS. 12A to 16D, the first substrate group is constituted by three substrates W1 and the second substrate group is also constituted by three substrates W2 for convenience of illustration.

[Step S01] Transport of Substrate from Carrier

The transport mechanism 17 of the stocker block 5 transports a first carrier C to a delivery shelf 18A. The collective transport mechanism HTR of the transferring block 7 collectively takes twenty-five substrates W1 in a horizontal posture from the first carrier C placed on the delivery shelf 18A, and transports the substrates W1 to the posture turning unit 20. Thereafter, the transport mechanism 17 transports the empty first carrier C to another shelf 18. Thereafter, the transport mechanism 17 transports a second carrier C to the delivery shelf 18A. The collective transport mechanism HTR collectively takes twenty-five substrates W2 in a horizontal posture from the second carrier C placed on the shelf 18A, and transports the substrates W2 to the posture turning unit 20.

[Step S02] Posture Turn to Vertical Posture

In the posture turning unit 20, fifty substrates W (W1, W2) of two carriers C are transported in units of twenty-five. As shown in FIGS. 3A to 3F, the posture turning unit 20 and the pusher mechanism 21 cause the fifty substrates W to be aligned at a half pitch (5 mm) in a face-to-face system, and turn the posture of the fifty substrates W from horizontal to vertical. The pusher mechanism 21 transports the fifty substrates W in the vertical posture below the two chucks 23 of the first transport mechanism WTR1 moved to the substrate delivery position P of the transferring block 7.

[Step S03] Chemical Treatment (Batch Treatment)

The first transport mechanism WTR1 receives the fifty substrates W in the vertical posture from the pusher mechanism 21, and transports the fifty substrates W to either the lifer LF1 or lifter LF2 of the two batch processing units BPU1, BPU2, respectively. For example, the first transport mechanism WTR1 transports the fifty substrates W to the lifter LF1 of the first batch processing unit BPU1. The lifter LF1 receives the fifty substrates W at a position above the process tank 26A. The lifter LF1 immerses the fifty substrates W in phosphoric acid within the process tank 26A. Accordingly, an etching treatment is performed on the fifty substrates W. After the etching treatment, the lifter LF1 pulls up the fifty substrates W from the phosphoric acid within the process tank 26A. It should be noted that similar treatment as in the first batch processing unit BPU1 is performed when the fifty substrates W are transported to the lifter LF2 of the second batch processing unit BPU2.

[Step S04] Deionized Water Cleaning Treatment (Batch Treatment)

The first transport mechanism WTR1 receives the fifty substrates W in the vertical posture from the lifter LF1 (or lifter LF2), and transports the fifty substrates W to the lifter LF3 of the third batch processing unit BPU3. The lifter LF3 receives the fifty substrates W (treatment substrate group), treated in either the batch processing unit BPU1 or the batch processing unit BPU2, at a position above the process tank 26C. The lifter LF3 immerses the fifty substrates W in deionized water within the process tank 26C. Accordingly, a cleaning treatment is performed on the fifty substrates W.

It should be noted that deionized water may be continuously supplied from the jet pipes 145 (see FIG. 12A) into the process tank 26C while the substrates W are immersed in deionized water. Moreover, the first transport mechanism WTR1 is moved to a position where it does not interfere with the second transport mechanism WTR2.

[Step S05] Underwater Posture Turn to Horizontal Posture

The underwater posture turning unit 24 turns a posture of the substrates W, on which the cleaning treatment is performed, from vertical to horizontal. Here, the following drawbacks arise. That is, if the posture of the fifty substrates W at a half pitch (a pitch of 5 mm) is collectively turned, one hand 29 of the center robot CR may not possibly enter a gap between two substrates W of the fifty substrates W satisfactorily. Accordingly, the substrates W may not possibly be taken out with one hand 29 satisfactorily.

In addition, when the substrates W are aligned in a face-to-face system, the substrates W whose posture is turned to horizontal may be a substrate W whose device face is directed upward or be a substrate W whose device face is directed downward. For example, it is not suitable that the hand 29 of the center robot CR contacts the device face of the substrate W. It is also not suitable that substrates W whose directions of the device faces are different are transported to the single-wafer processing units SWP1 to SWP3.

Then, in this embodiment, a gap between two adjacent substrates W is widened and the device faces of the fifty substrates W face to the same direction. This is to be described in detail with reference to steps S11 to S25 of flow charts shown in FIGS. 10 and 11.

[Step S11] Transport of First Substrate Group Above Underwater Posture Turning Unit The lifting mechanism 28 of the lifter LF3 performs first relative lifting and lowering operation of the substrate holder 27 of the lifter LF3 and the second transport mechanism WTR2 at a given delivery position. Here, the given delivery position is determined by the tank-to-tank moving unit 55 of the second transport mechanism WTR2 and the substrate alignment direction moving unit 53.

Moreover, through the first relative lifting operation, the second transport mechanism WTR2 takes out the aligned twenty-five substrates W1 in the first substrate group (first divided substrate group) one alternately from the substrate holder 27 while holding the substates W1 with the holding grooves 43, 44. Then, the second transport mechanism WTR2 transports the taken out twenty-five substrates W1 in the first substrate group to the underwater posture turning unit 24. Moreover, through the first relative lifting operation, the second transport mechanism WTR2 causes the twenty-five substrates W2 in the other second substrate group (second divided substrate group) to pass via the passing grooves 45, 46, thereby keeping the substrates W2 in the second substrate group held with the substrate holder 27 of the lifter LF2. The operation is to be described in detail.

The tank-to-tank moving unit 55 of the second transport mechanism WTR2 moves the two chucks 41, 42 to a position above the lifter LF3 of the third batch processing unit BPU3. Moreover, the swing unit 51 separates two tip ends of the two chucks 41, 42 from each other, thereby making the two chucks 41, 42 opened. Moreover, the substrate alignment direction moving unit 53 moves the two chucks 41, 42 in the Y-direction, thereby moving the two chucks 41, 42 to the first holding position. Here, the first holding position is a position where the twenty-five paired holding grooves 43, 44 can hold twenty-five substrates W1 in the first substrate group.

Thereafter, the lifting mechanism 28 of the lifter LF3 moves upward the substrate holder 27 holding the fifty substrates W. Accordingly, the fifty substrates W are pulled out of the deionized water within the process tank 26C.

Reference is made to FIG. 12A. Thereafter, the second transport mechanism WTR2 grips the fifty substrates W, held by the substrate holder 27 of the lifter LF3, with the two chucks 41, 42. Accordingly, as shown by a round frame in FIG. 12A, the substrates W1 are accommodated individually in the holding grooves 43, 44 of the chucks 41, 42, respectively. Moreover, the substrates W2 are accommodated individually in the passing grooves 45, 46. FIG. 12A illustrates in the round frame a plan view of a situation where the substrates W1 (W2) are accommodated individually in the holding grooves 43, 44 and the passing grooves 45, 46 of the chucks 41, 42, respectively.

Here, for the fifty substrates W, the twenty-five substrates W1 and the twenty-five substrates W2 are alternately arranged one by one. Moreover, the fifty substrates W are arranged in a face-to-face system and at a half pitch. Moreover, as shown by an arrow AR in the round frame of FIG. 12A, the device faces of the substrates W1 are each directed rightward Y The device faces of the substrates W2 are each directed leftward Y.

Reference is made to FIG. 12B. Thereafter, the lifting mechanism 28 of the lifter LF3 moves the substrate holder 27 downward. Accordingly, the substrates W1, accommodated individually in the holding grooves 43, 44 of the chucks 41, 42, respectively, are held with the chucks 41, 42. In contrast to this, the substrates W2, accommodated individually in the passing grooves 45, 46 of the chucks 41, 42, respectively, are not held with the chucks 41, 42, but remain in the lifter LF3. That is, the second transport mechanism WTR2 can pull out the twenty-five substrates W1 in the first substrate group from the fifty substrates W held by the substrate holder 27 of the lifter LF3. The twenty-five substrates W1 are arranged at a full pitch. This can widen the gap between the two adjacent substrates W. Here, the full pitch (first pitch) is twice the half pitch (second pitch).

The twenty-five substrates W2 in the second substrate group that are not pulled out by the second transport mechanism WTR2 but remain on the substrate holder 27 of the lifter LF3 are immersed in the deionized water of the process tank 26C. This can prevent drying of the substrates W2 in the second substrate group. FIG. 12B illustrates in an upper round frame thereof a plan view of a state where the two chucks 41, 42 of the second transport mechanism WTR2 hold the twenty-five substrates W1. FIG. 12B illustrates in a lower round frame thereof a plan view of a state where the lifter LF3 holds the twenty-five substrates W2.

[Step S12] Receipt of First Substrate Group by Pusher

Reference is made to FIG. 12C. The twenty-five substrates W2 held by the lifter LF3 are immersed in the deionized water of the process tank 26C. Moreover, after the second transport mechanism WTR2 pulls out the twenty-five substrates W1, the second transport mechanism WTR2 moves above the immersion tank 73 and the pusher 75 of the underwater posture turning unit 24. Thereafter, the pusher lifting mechanism 111 (FIG. 8) moves the pusher 75 upward to the above of the in-tank carrier 76 whose front opening 81 is directed upward. Moreover, the pusher 75 holds the twenty-five substrates W1 from below that are held by the second transport mechanism WTR2.

Thereafter, the two chucks 41, 42 of the second transport mechanism WTR2 release holding of the twenty-five substrates W1. Specifically, the swing unit 51 makes the two chucks 41, 42 opened. Accordingly, the pusher 75 receives the twenty-five substrates W1 from the second transport mechanism WTR2. Thereafter, the second transport mechanism WTR2 moves from the above of the underwater posture turning unit 24, for example.

[Step S13] 180-Degree Rotation of First Substrate Group Around Vertical Axis

Figure 13A:
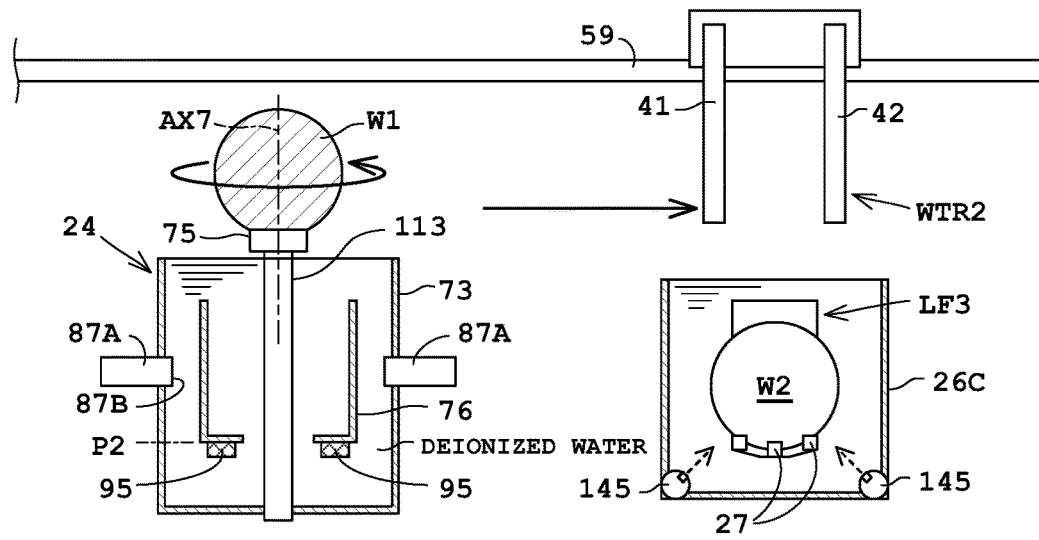

Reference is made to FIG. 13A. The pusher rotating mechanism 110 (see FIG. 8) rotates the pusher 75, holding the twenty-five substrates W1, by 180 degrees around the vertical axis AX7. Accordingly, the substrates W1 whose device faces are directed from back to front (rightward Y) in FIGS. 12B, 12C can be reversed. This causes the substrates W1 to face toward direction from front to back (leftward Y). Consequently, the device faces of the substrates W1 in the horizontal posture, to which posture turn mentioned later is made, can be directed upward.

[Step S14] Accommodation of First Substrate Group to in-Tank Carrier

Figure 13B:
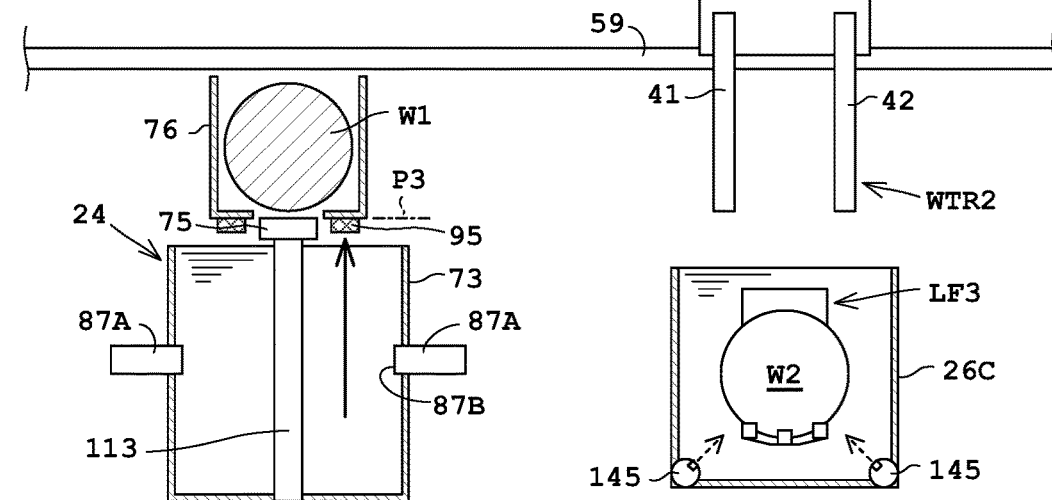

Reference is made to FIG. 13B. Thereafter, the lifting mechanism 97 of the lifter LF4 moves the two supporting portions 95, on which the in-tank carrier 76 is placed, upward to the third height position P3. Accordingly, the in-tank carrier 76 is taken out of the deionized water within the immersion tank 73. Moreover, a position of the pusher 75 is changed from above the in-tank carrier 76 to below the in-tank carrier 76. Accordingly, the in-tank carrier 76 receives the twenty-five substrates W1 from the pusher 75. That is, the twenty-five substrates W1 in the first substrate group rotated by 180 degrees are accommodated in the in-tank carrier 76.

Figure 13C:
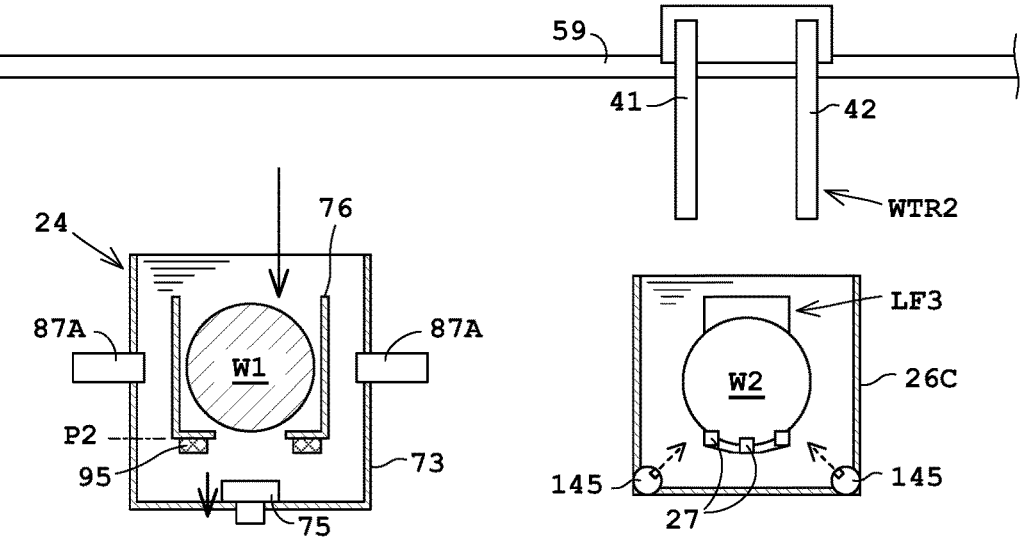

[Step S15] Immersion of First Substrate Group in Deionized Water Stored in Immersion Tank Reference is made to FIG. 13C. The pusher lifting mechanism 111 (FIG. 8) moves the pusher 75 downward to a position near the bottom face of the immersion tank 73.

Moreover, the lifting mechanism 97 of the lifter LF4 moves the supporting portions 95, on which the in-tank carrier 76 is placed, downward to the second height position P2. Accordingly, the twenty-five substrates W1 accommodated in the in-tank carrier 76 are immersed in the deionized water within the immersion tank 73.

Figure 14A:
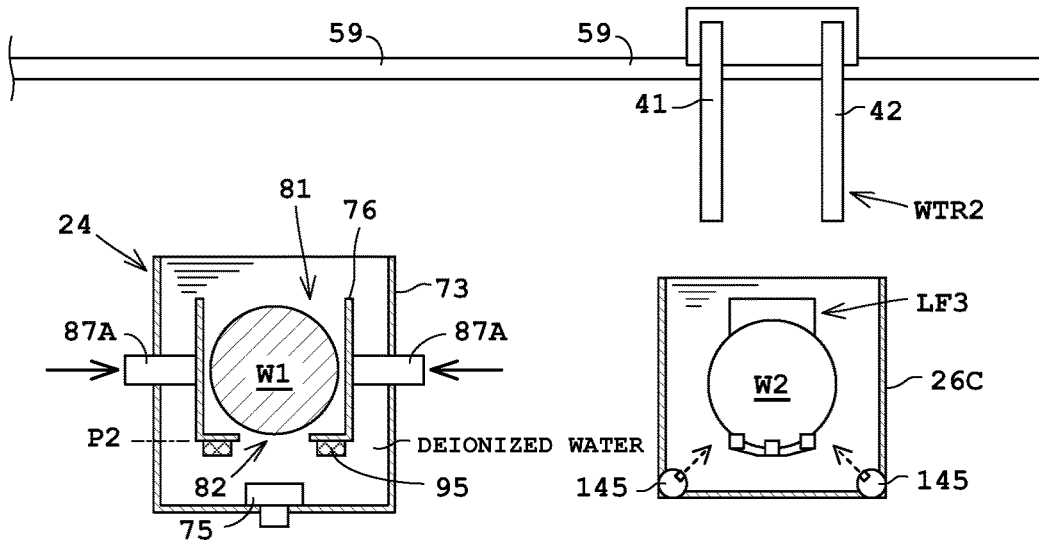

[Step S16] Posture Turn of First Substrate Group from Vertical to Horizontal Reference is made to FIG. 14A. The rotating mechanism 79 (see FIG. 6) actuates the air cylinder 87 to advance the operating shaft 87A into the in-tank carrier 76. The rotating mechanism 79 causes the operating shaft 87A to advance to the connecting position. Accordingly, the engaging piece 87B of the air cylinder 87 engages with the engaging portion 85 of the in-tank carrier 76. The in-tank carrier 76 is grasped by the one-paired operating shafts 87A while the lower part thereof is supported by the supporting portions 95 of the lifter LF4. Thereafter, the lifting mechanism 97 moves the supporting portions 95 downward to the first height position P1. Accordingly, the in-tank carrier 76 is made grasped by only the one-paired operating shafts 87A.

Figure 14B:
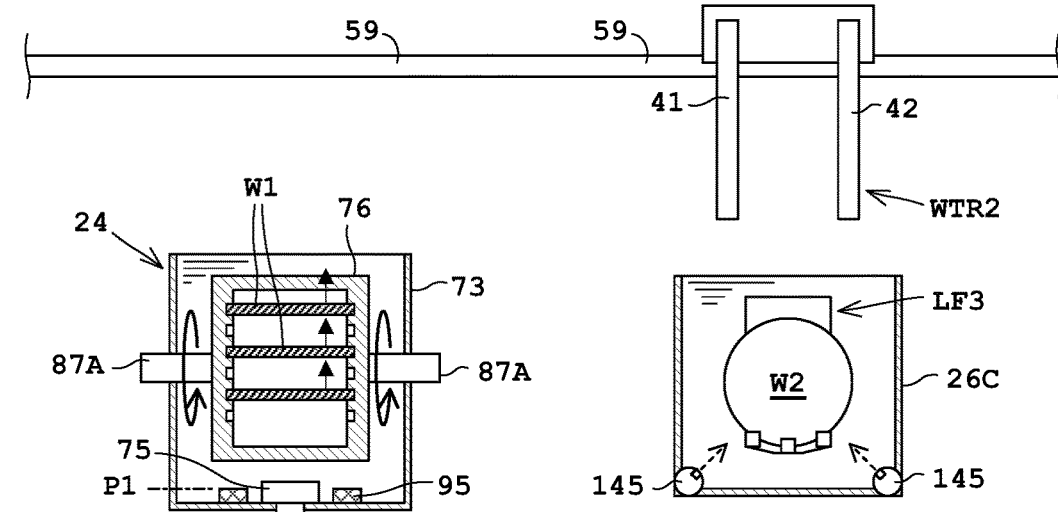

Reference is made to FIG. 14B. The motor 89 of the rotating mechanism 79 rotates the in-tank carrier 76 together with the air cylinder 87 around an axis in the front-back direction X. That is, the front opening 81 of the in-tank carrier 76 directed upward is turned by 90 degrees toward the second line R2 where the center robot CR is arranged. Accordingly, the in-tank carrier 76 turns from a lateral (horizontal) posture to a longitudinal (vertical) posture. As a result, the posture of the twenty-five substrates W1 turns from vertical to horizontal. At this time, the twenty-five substrates W1 in the in-tank carrier 76 are kept immersed in the deionized water in the immersion tank 73. No part of the twenty-five substrates W1 are exposed from the deionized water when the posture thereof turns.

Figure 14C:
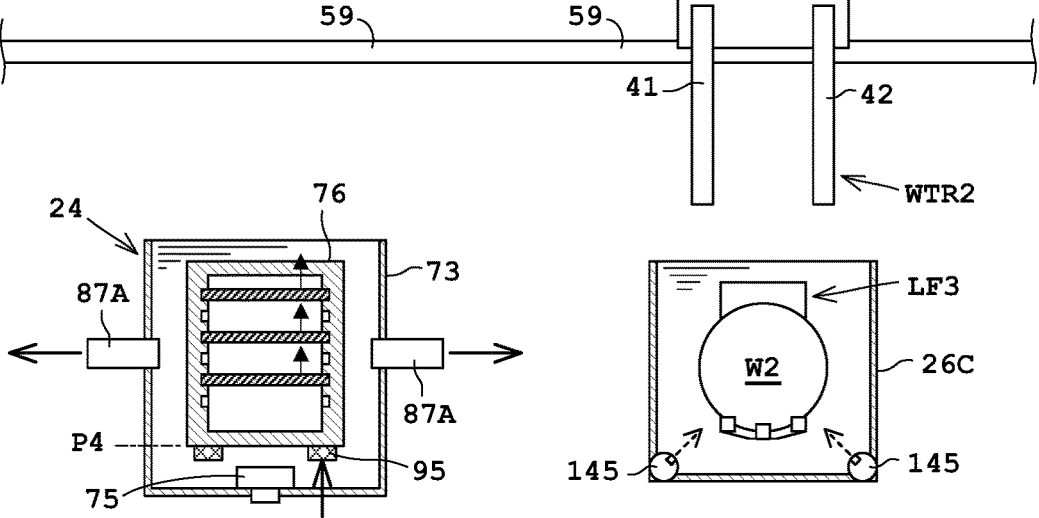

Reference is made to FIG. 14C. The lifting mechanism 97 moves the supporting portions 95 of the lifter LF4 upward to the fourth height position P4. Accordingly, the supporting portions 95 of the lifter LF4 hold the in-tank carrier 76 in the vertical posture in the liquid. Moreover, the air cylinder 87 shrinks to move the operating shafts 87A to the opened position. Accordingly, the in-tank carrier 76 is held only with the supporting portions 95 of the lifter LF4.

[Step S17] Taking Substrate in First Substrate Group Out of in-Tank Carrier

Figure 15A:
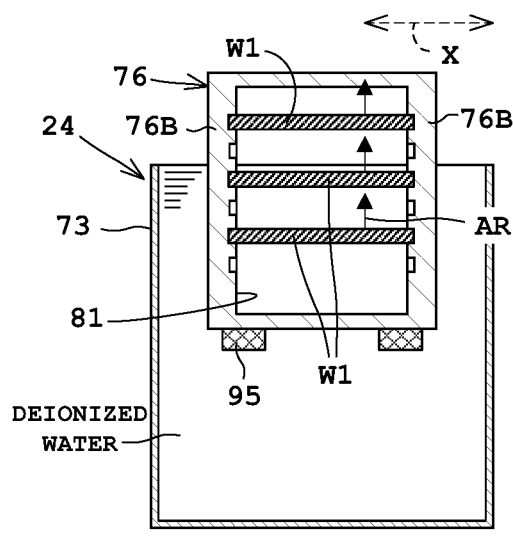
FIG. 15A is a front view illustrating operation of the underwater posture turning and the like, FIG. 15B is a left side view illustrating the operation of the underwater posture turning and the like in FIG. 15A, and FIGS. 15C to 15D are each a front view illustrating operation of the underwater posture turning.
Figure 15B:
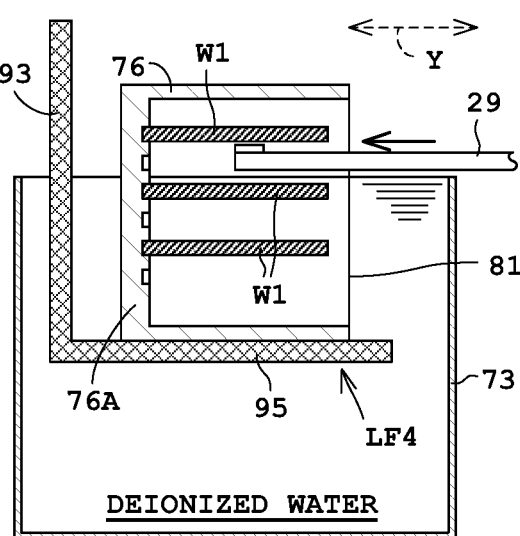

Reference is made to FIGS. 15A and 15B. The lifting mechanism 97 moves the supporting portions 95 of the lifter LF4 upward from the fourth height position P4. Accordingly, only an uppermost substrate W1 in the in-tank carrier 76 is moved upward to a position where the substrate W1 is exposed from the liquid level. The substrate W1 is a target to be transported by the center robot CR. Accordingly, the uppermost substrate W1 is exposed above the liquid level of the immersion tank 73 while the deionized water stored in the immersion tank 73 covers an upper surface of the uppermost substrate W1. In such a condition, the center robot CR advances the hand 29 into the in-tank carrier 76 to unload the uppermost substrate W1.

When the center robot CR moves to the underwater posture turning unit 24 for transporting a next substrate W, the lifting mechanism 97 moves the in-tank carrier 76 further upward. Specifically, the lifting mechanism 97 moves the supporting portions 95 and the like upward such that only next one substrate W1 is exposed above the liquid level of the immersion tank 73. In such a condition, the center robot CR unloads the substrate W1. As described above, the lifting mechanism 97 moves the in-tank carrier 76 upward gradually each time the center robot CR comes. Accordingly, all the substrates W1 are transported by the center robot CR while they are wet with the deionized water.

That is, the twenty-five substrates W1 are immersed in the deionized water of the immersion tank 73 from when the twenty-five substrates W1 are immersed in the deionized water until when the substrates W1 are taken out by center robot CR. This prevents drying of the substrates W1 in the underwater posture turning unit 24. Accordingly, pattern collapse on the device face of the substrate W caused by drying can be prevented. It should be noted that the same is applicable to the substrates W2 in the second substrate group.

[Step S18] Preparation of Receiving Second Substrate Group

Figure 15C:
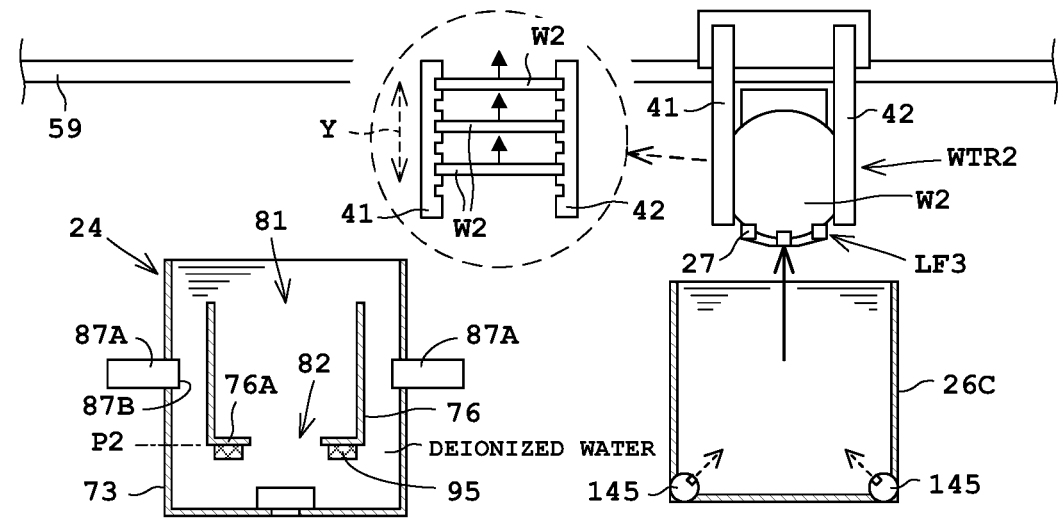

Reference is made to FIG. 15C. After the center robot CR transports all the twenty-five substrates W within the in-tank carrier 76, the underwater posture turning unit 24 turns the in-tank carrier 76 back such that the front opening 81 in FIG. 15A is turned from a lateral state to an upward state.

As shown in FIG. 14C, the lifter LF3 holds the twenty-five substrates W2, and causes the twenty-five substrates W2 to be immersed in the deionized water within the process tank 26C. Then, the posture of the residual twenty-five substrates W2 (second substrate group) held by the lifter LF3 is turned.

[Step S19] Transport of Second Substrate Group Above Underwater Posture Turning Unit The following describes a summary of operation of this step. The substrate alignment direction moving unit 53 moves the second transport mechanism WTR2 and the substrate holder 27 of the lifter LF3, from which the twenty-five substrates W1 in the first substrate group are pulled out and which holds the twenty-five substrates W2 in the second substrate group, relatively in the horizontal direction by a given pitch (e.g., a half pitch) in an alignment direction where the twenty-five substrates W2 are aligned.

After the horizontal movement as above, the lifting mechanism 28 of the lifter LF3 performs second relative lifting operation of the substrate holder 27 of the lifter LF3 and the second transport mechanism WTR2 at a given delivery position. Through the second relative lifting and lowering movement, the second transport mechanism WTR2 holds and receives the twenty-five substrates W2 in the second substrate group, held by the substrate holder 27 of the lifter LF3, with the holding grooves 43, 44. Then, the second transport mechanism WTR2 transports the received twenty-five substrates W2 in the second substrate group to the underwater posture turning unit 24. The operation is to be described in detail.

The tank-to-tank moving unit 55 of the second transport mechanism WTR2 moves the two chucks 41, 42 upward to a position above the lifter LF3. Moreover, the swing unit 51 makes the two chucks 41, 42 opened. Moreover, the substrate alignment direction moving unit 53 moves the two chucks 41, 42, in the Y-direction by a distance corresponding to a half pitch, thereby moving the two chucks 41, 42, to the second holding position. Here, the second holding position is a position where twenty-five paired holding grooves 43, 44 can hold twenty-five substrates W2 in the second substrate group.

Reference is made to FIG. 15C. The lifting mechanism 28 of the lifter LF3 moves upward the substrate holder 27 holding the twenty-five substrates W2, thereby pulling the substrates W2 from the deionized water in the process tank 26C. Thereafter, the swing unit 51 of the second transport mechanism WTR2 causes the two chucks 41, 42 to be closed, thereby gripping the twenty-five substrates W2 with the two chucks 41, 42. At this time, the twenty-five substrates W2 are accommodated individually in the twenty-five one-paired holding grooves 43, 44 of the two chucks 41, 42. Thereafter, the lifting mechanism 28 of the lifter LF3 moves the substrate holder 27 downward. Accordingly, the two chucks 41, 42 of the second transport mechanism WTR2 hold the twenty-five substrates W2.

The tank-to-tank moving unit 55 moves the twenty-five substrates W2 from the above of the lifter LF3 to the above of the pusher 75 of the underwater posture turning unit 24 while keeping hold of the twenty-five substrates W2.

[Step S20] Receipt of Second Substrate Group by Pusher

Figure 15D:
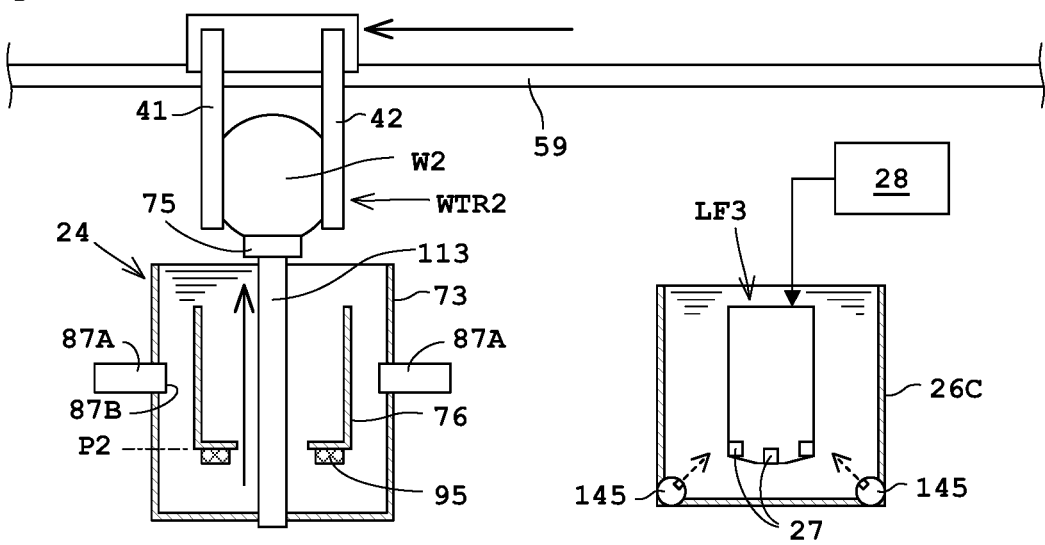

Reference is made to FIG. 15D. The pusher lifting mechanism 111 (FIG. 8) moves the pusher 75 upward to the above of the in-tank carrier 76 whose front opening 81 is directed upward. Moreover, the pusher 75 holds the twenty-five substrates W2 from below that are held by the second transport mechanism WTR2. Thereafter, the swing unit 51 opens the two chucks 41, 42. Accordingly, the pusher 75 receives the twenty-five substrates W2 from the second transport mechanism WTR2. Thereafter, the second transport mechanism WTR2 moves from the above of the underwater posture turning unit 24, for example.

[Step S21] Accommodation of Second Substrate Group to in-Tank Carrier

Thereafter, the lifting mechanism 97 of the lifter LF4 moves the two supporting portions 95, on which the in-tank carrier 76 is placed, upward to the third height position P3. Accordingly, the in-tank carrier 76 is taken out of the deionized water within the immersion tank 73, and the twenty-five substrates W2 held by the pusher 75 are accommodated in the in-tank carrier 76.

Figure 16A:
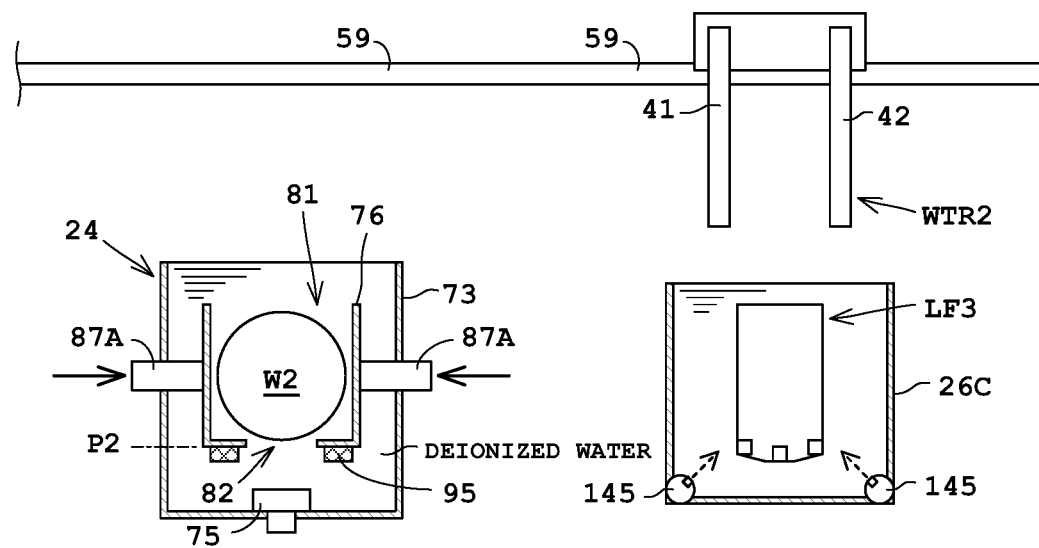
FIGS. 16A to 16C are each a front view illustrating operation of the underwater posture turning and the like, and FIG. 16D is a left side view illustrating the operation of the underwater posture turning and the like in FIG. 16C.

[Step S22] Immersion of Second Substrate Group in Deionized Water Stored in Immersion Tank Reference is made to FIG. 16A. Thereafter, the linear actuator 133 moves the pusher 75 downward to a position near the bottom face of the immersion tank 73. Moreover, the lifting mechanism 97 immerses the in-tank carrier 76 in the deionized water in the immersion tank 73.

[Step S23] Posture Turn of Second Substrate Group from Vertical to Horizontal

Figure 16B:
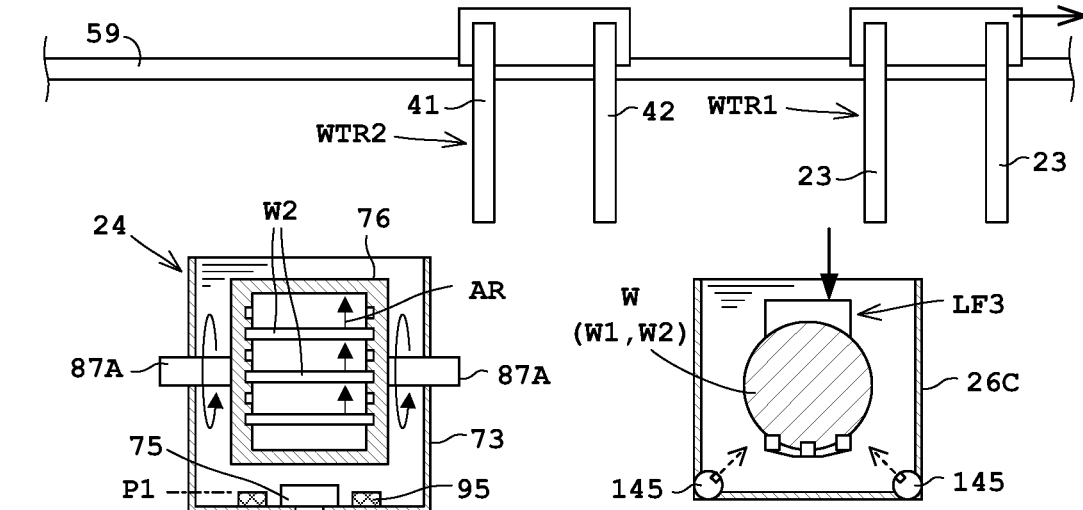

Thereafter, the rotating mechanism 79 actuates the air cylinder 87 to advance the operating shaft 87A to the connecting position. Accordingly, the two operating shafts 87A grips the two side walls 76B of the in-tank carrier 76. Reference is made to FIG. 16B. Thereafter, the lifting mechanism 97 of the lifter LF4 moves the supporting portions 95 downward to the first height position P1. Thereafter, the motor 89 of the rotating mechanism 79 rotates the in-tank carrier 76 together with the air cylinder 87 around the operating shaft 87A. As a result, the posture of the twenty-five substrates W2 turns from vertical to horizontal. No part of the twenty-five substrates W2 are exposed from the deionized water when the posture thereof turns. Moreover, after the posture turn, the front opening 81 of the in-tank carrier 76 is directed toward the second line R2 where the center robot CR is arranged. Moreover, the device faces of the twenty-five substrates W2 in a horizontal posture are directed upward.

The lifting mechanism 97 of the lifter LF4 moves the supporting portions 95 upward to the fourth height position P4. Accordingly, the supporting portions 95 of the lifter LF4 hold the in-tank carrier 76 in the vertical posture in the liquid. Moreover, the air cylinder 87 shrinks to move the operating shafts 87A to the opened position. Accordingly, the in-tank carrier 76 is held only with the lifter LF4.

[Step S24] Taking Substrate in Second Substrate Group Out of in-Tank Carrier

Figure 16C:
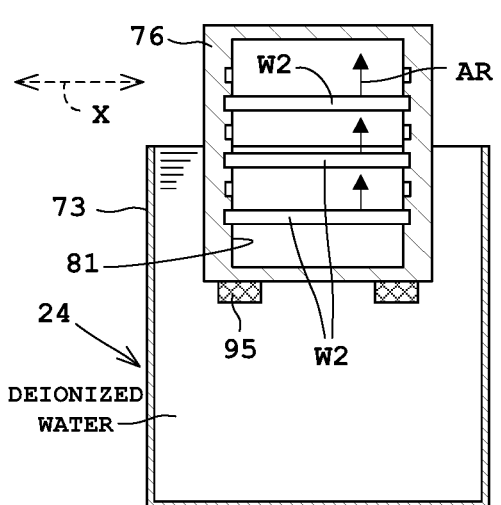
Figure 16D:
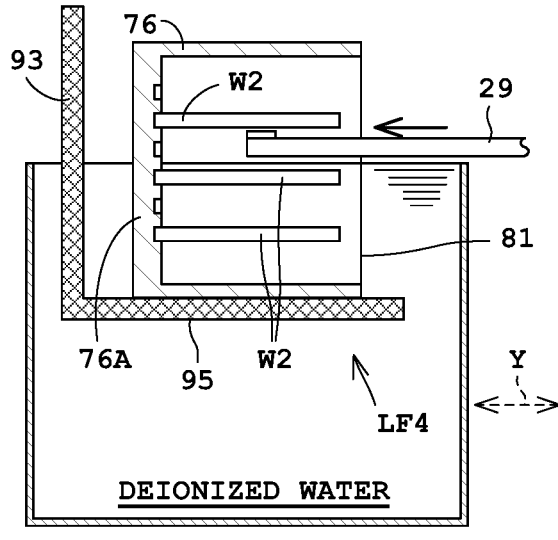
Figure 18:
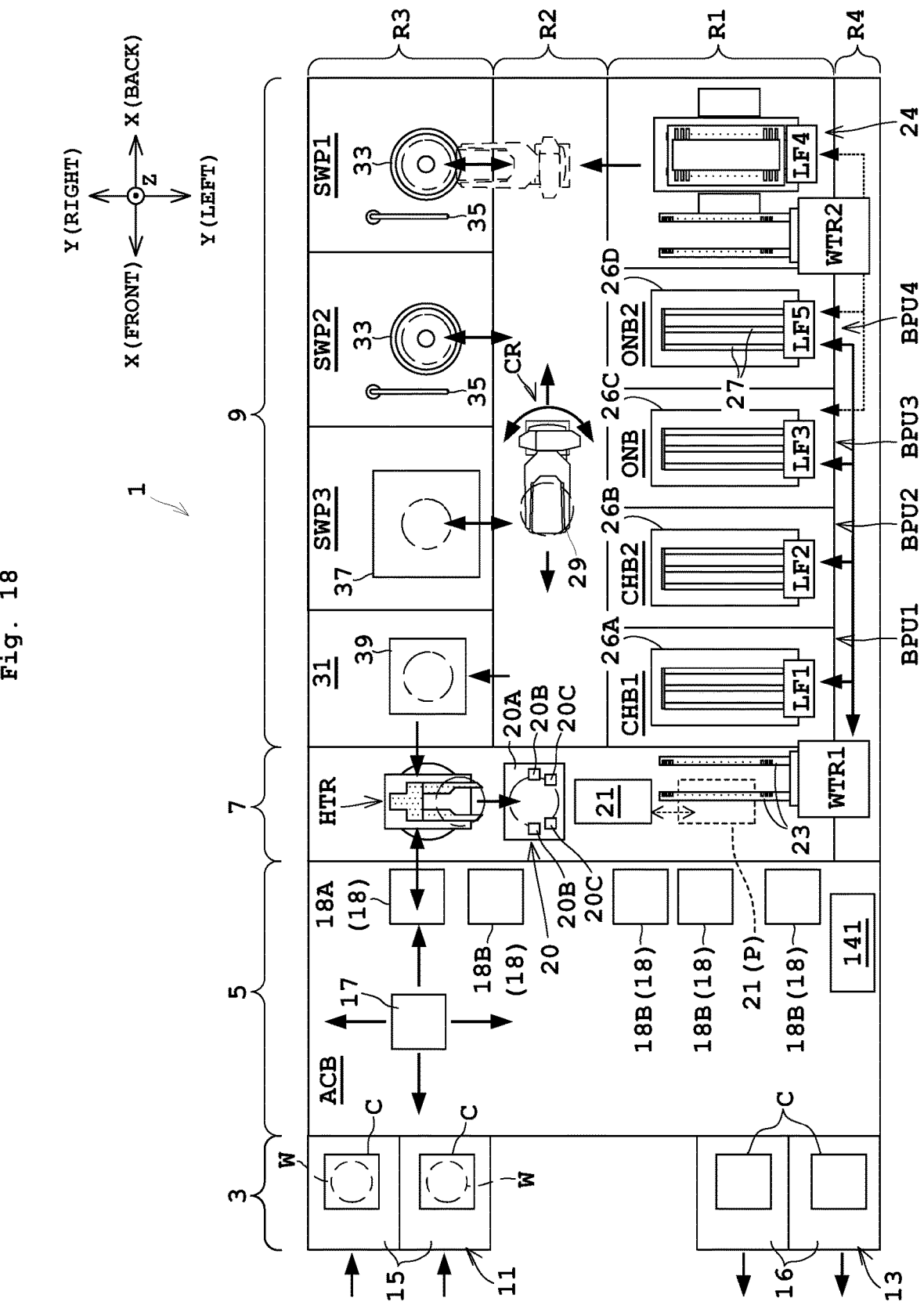
FIG. 18 is a plan view schematically illustrating a configuration of a substrate treating apparatus according to the modification.

Reference is made to FIGS. 16C and 16D. The lifting mechanism 97 of the lifter LF4 moves the supporting portions 95 upward from the fourth height position P4. Accordingly, one substrate W of the twenty-five substrates W2 is pulled out of the liquid level. The center robot CR takes one substrate W2, pulled out of the liquid level, from the in-tank carrier 76. Accordingly, the substrates W2 are transported by the center robot CR while they are wet with the deionized water. Here, the twenty-five substrates W2 are arranged at a full pitch, and thus the hand 29 of the center robot CR easily enters.

[Step S25] Preparation of Receiving Next Substrate Group

After the center robot CR transports all the twenty-five substrates W2 within the in-tank carrier 76, the underwater posture turning unit 24 turns the in-tank carrier 76 back such that the front opening 81 in FIG. 16C is turned from a lateral state to an upward state. This achieves a condition where a next substrate group is received. Here in the lifter LF3, the first transport mechanism WTR1 transports next fifty substrates W to be treated. The fifty substrates W are immersed in the deionized water stored in the process tank 26C. This yields prevention of drying the substrates W.

[Step S06] First Single-Wafer Treatment

Description returns to the flowchart in FIG. 9. The substrates W transported by the center robot CR in such a manner as described above are treated as under, for example.

The center robot CR transports the substrates W (W1, W2) taken out from the in-tank carrier 76 to either the single-wafer processing unit SWP1 or SWP2. For example, the center robot CR transports the substrate W to the first single-wafer processing unit SWP1. While being transported, the device face of the substrate W is directed upward. The rotating unit 33 of the first single-wafer processing unit SWP1 holds the transported substrate W, and rotates the substrate W around the vertical axis. Moreover, the first single-wafer processing unit SWP1 supplies deionized water from the nozzle 35 to the device face of the substrate W. Then, the first single-wafer processing unit SWP1 supplies IPA from the nozzle 35 to the device face of the substrate W to replace the deionized water on the substrate W by the IPA. Here, the second single-wafer processing unit SWP2 performs the same treatment as that by the first single-wafer processing unit SWP1.

[Step S07] Second Single-Wafer Treatment (Dry Treatment)

Thereafter, the center robot CR receives the substrate W from the rotating unit 33 of either the single-wafer processing unit SWP1 or SWP2, and transports the substrate W into the supercritical fluid chamber 37 of the third single-wafer processing unit SWP3. The supercritical fluid chamber 37 performs dry treatment on the substrate W with carbon dioxide under a supercritical state. This dries the substrate W while suppressing collapse of the patterns formed on the substrate W.

[Step S08] Substrate Transport from Substrate Buffer to Carrier

The substrate W subjected to the treatment in the supercritical fluid chamber 37 is transported to the buffer unit 31 by the center robot CR. The center robot CR places the substrate W on the mount shelf 39 of the buffer unit 31. When the substrates W1 in one lot (twenty-five) are placed on the buffer unit 31, the collective transport mechanism HTR collectively takes the twenty-five substrates W1 from the buffer unit 31, and transports the twenty-five substrates W1 into an empty first carrier C placed on the shelf 18A.

Thereafter, the transport mechanism 17 transports the first carrier C to the unloading unit 13.

Moreover, when the substrates W2 in one lot are placed on the buffer unit 31, the collective transport mechanism HTR transports the twenty-five substrates W2 into a second carrier C placed on the shelf 18A. Thereafter, the transport mechanism 17 transports the second carrier C to the unloading unit 13. Thereafter, an external transport mechanism, not shown, transports the two carriers C into a next destination in order.

According to this embodiment, the one-paired chucks 41, 42 of the second transport mechanism WTR2 includes the holding grooves 43, 44 and the passing grooves 45, 46, respectively, that are arranged one by one alternately. Accordingly, the one-paired chucks 41, 42 can pull out the substrates W1 (W2) alternately from the treatment substrate group constituted by the fifty substrates W held by the substrate holder 27 of the lifter LF3, and transport the pulled-out divided substrate group (twenty-five substrates W1 and twenty-five substrates W2) to the underwater posture turning unit 24 individually. This can widen the gap between the two adjacent substrates W1 (W2). Moreover, the underwater posture turning unit 24 turns the posture of the pulled out substrates W1 (W2) from vertical to horizontal. Accordingly, the hand 29 of the center robot CR can enter between the two adjacent substrates W1 (W2), thereby taking one substrate W1 (W2) easily, for example.

Moreover, the substrate treating apparatus 1 further includes the first transport mechanism WTR1 that can collectively transport fifty substrates W (treatment substrate group) to the substrate holder 27 of the lifter LF3. The first transport mechanism WTR1 can collectively transport fifty substrates W to the substrate holder 27. Moreover, the second transport mechanism WTR2 can transport divided substrate groups (twenty-five substrates W1 and twenty-five substrates W2) individually that are pulled out by two times from the fifty substrates W held by the substrate holder 27.

Moreover, the substrate treating apparatus 1 further includes the process tank 26C for storing deionized water. The lifting mechanism 28 of the lifter LF3 moves the substrate holder 27 upward and downward. When the second transport mechanism WTR2 does not transport any of the divided substrate groups (twenty-five substrates W1 and twenty-five substrates W2) individually, the lifting mechanism 28 causes the fifty substrates W or a second divided substrate group (twenty-five substrates W2) to be immersed in the deionized water stored in the process tank 26C. Since the substrates W (W1, W2) are immersed in the deionized water stored in the process tank 26C, yielding prevention of drying the substrates W.

Moreover, the underwater posture turning unit 24 includes the in-tank carrier 76 having the front opening 81 configured to pass the divided substrate groups individually, and the two side walls 76B where the fifty-paired substrate holding grooves 84 for accommodating each of the divided substrate group passing the front opening 81 face one another. The in-tank carrier 76 includes a back wall 76A that faces the front opening 81 and has a back opening 82 formed therein whose area is smaller than that of the front opening 81. The underwater posture turning unit 24 includes the lifter LF4 having the supporting portions 95 for supporting the in-tank carrier 76 and the lifting mechanism 97 for moving the supporting portions 95 upward and downward, the immersion tank 73 for accommodating the in-tank carrier 76 and the supporting portions 95 and storing deionized water, and the rotating mechanism 79 for rotating the in-tank carrier 76, immersed in the deionized water in the immersion tank 73, around the horizontal axis (operating shaft 87A) for collectively turning the posture of the divided substrate groups from vertical to horizontal.

Moreover, the underwater posture turning unit 24 includes the pusher 75 for holding the divided substrate groups, held by the second transport mechanism WTR2, from below, the pusher lifting mechanism 111 for moving the pusher 75 upward and downward, and the pusher rotating mechanism 110 for rotating the pusher 75 around the vertical axis AX7. When the front opening 81 of the in-tank carrier 76 is directed upward, the pusher 75 can pass the back opening 82 and the front opening 81 of the in-tank carrier 76 and move upward and downward between a position adjacent to the bottom face of the immersion tank 73 and a position above the immersion tank 73. When pusher 75 is changed from a state above the in-tank carrier 76 to a state below the in-tank carrier 76, the in-tank carrier 76 receives the divided substrate groups from the pusher 75 individually.

The underwater posture turning unit 24 causes the in-tank carrier 76 to be immersed in the deionized water in the immersion tank 73 while accommodating one of the divided substrate groups into the in-tank carrier 76. Thereafter, the underwater posture turning unit 24 rotates the in-tank carrier 76 immersed in the deionized water around the horizontal axis (operating shaft 87A) to turn the posture of the divided substrate group from vertical to horizontal. Accordingly, the substrates W1 (W2) are immersed in the deionized water until the center robot CR takes the substrates W1 (W2) in the horizontal posture from the in-tank carrier 76. Consequently, drying of the substrates W1 (W2) can be prevented, resulting in suppressed pattern collapse of the substrates W1 (W2).

Moreover, the control unit 141 causes the pusher lifting mechanism 111 to move the pusher 75 upward to the above of the in-tank carrier 76 whose front opening 81 is directed upward, whereby the first divided substrate group (twenty-five substrates W1) is received from the second transport mechanism WTR2 by the pusher 75. The control unit 141 causes the pusher rotating mechanism 110 to rotate the pusher 75, holding the first divided substrate group, by 180 degrees around the vertical axis AX7. The control unit 141 causes the in-tank carrier 76 to move upward relatively, whereby the first divided substrate group rotated by 180 degrees is accommodated in the in-tank carrier 76. The control unit 141 causes the rotating mechanism 79 to rotate the in-tank carrier 76 immersed in the deionized water within the immersion tank 73 around the horizontal axis to turn the posture of the first divided substrate group from vertical to horizontal.

The first divided substrate group (twenty-five substrates W1) can face to any direction before the first divided substrate group (twenty-five substrates W1) are accommodated in the in-tank carrier 76.

Moreover, the rotating mechanism 79 includes the two operating shafts 87A configured to grip the in-tank carrier 76 and release gripping of the in-tank carrier 76, and the two motors 89 configured to rotate the two shafts around the horizontal axis as the central axis of at least one of the two shafts. The two operating shafts 87A and the two motors 89 can turn the posture of the twenty-five substrates W1 in liquid that are accommodated in the in-tank carrier 76. Here in FIG. 6, one of the two motors 89 need not be provided, for example. In this case, one motor 89 rotates the in-tank carrier 76 gripped with the two operating shafts 87A.

The present invention is not limited to the foregoing examples, but may be modified as follows.

(1) In the embodiment described above, the substrate treating apparatus 1 includes the first transport mechanism WTR1 for transporting fifty substrates W aligned at a half pitch, and the second transport mechanism WTR2 for transporting twenty-five substrates W1 (W2) aligned at a half pitch. In this regard, the substrate treating apparatus 1 need not include the first transport mechanism WTR1. That is, the second transport mechanism WTR2 may also be configured so as to transport fifty substrates W aligned at a half pitch.

FIG. 17A is a side view of one chuck 41, a swing unit 51, and the like in a second transport mechanism WTR2 according to one modification. FIG. 17B is a longitudinal sectional view of holding grooves 43, 44, and upper holding grooves 151, 152 seen from an arrow EE in FIG. 17A. FIG. 17C is a longitudinal sectional view of passing grooves 45, 46, and the upper holding grooves 151, 152 seen from an arrow FF in FIG. 17A. Here in FIG. 17A, the chuck 41 includes three holding grooves 43, three passing grooves 45, and six upper holding grooves 151 for convenience of illustration.

The second transport mechanism WTR2 further includes a plural-paired (e.g., fifty-paired) upper holding grooves 151, 152. The fifty-paired upper holding grooves 151, 152 are provided above twenty-five-paired holding grooves 43, 44, and twenty-five-paired passing grooves 45, 46, respectively. Moreover, the plural-paired upper holding grooves 151, 152 are provided in the one-paired chucks 41, 42, respectively. The upper holding grooves 151, 152 face each other. The upper holding grooves 151, 152 each hold one substrate W in a vertical posture. The fifty-paired upper holding grooves 151, 152 are arranged in a direction where the fifty substrates W are aligned at a pitch (half pitch) at which the fifty substrates W (treatment substrate group) are aligned.

In FIG. 1, the second transport mechanism WTR2 in this modification transports fifty substrates W between the pusher mechanism 21 and the three lifters LF1 to LF3. Moreover, the second transport mechanism WTR2 transports twenty-five substrates W1 (W2) between the lifter LF3 and the pusher 75.

In this modification, one-paired chucks 41, 42 have two functions. Specifically, a first function is that the one-paired holding grooves 43, 44 and the one-paired passing grooves 45, 46 can hold substrates W1 (W2) alternately. A second function is that the one-paired upper holding grooves 151, 152 can hold the aligned substrates W not one by one alternately but successively. With this modification, the first transport mechanism WTR1 having the second function is not necessarily provided other than the second transport mechanism WTR2 having the first function. Accordingly, the number of transport mechanisms can be reduced.

(2) In the embodiment and the modification (1) described above, the first line R1 includes the two chemical processing units CHB1, CHB2, the one deionized water processing unit ONB, and the underwater posture turning unit 24 as show in FIG. 1. In this regard, the first line R1 may further include one or more deionized water processing units ONB2 (batch processing units BPU4). Accordingly, the second deionized water processing unit ONB2 can perform deionized water cleaning treatment on other fifty substrates W while twenty-five substrates W2 in the second substrate group are immersed in the deionized water within the process tank 26C of the first deionized water processing unit ONB. Here, the first line R1 may include one chemical processing unit or three or more chemical processing units.

(3) In the embodiment and the modifications described above, the in-tank carrier 76 and the supporting portions 95 move upward relative to the immersion tank 73 when the substrates W are delivered to the center robot CR. However, such an embodiment is not limitative in the present invention. For example, the immersion tank 73 may move downward relative to the in-tank carrier 76 and the supporting portions 95.

(4) In the embodiment and the modifications described above, the third single-wafer processing unit SWP3 includes the supercritical fluid chamber 37, and performs dry treatment to the substrates W with use of the supercritical fluid. However, the third single-wafer processing unit SWP3 may include a rotating unit 33 and a nozzle 35 like the single-wafer processing units SWP1, SWP2. That is, the single-wafer processing units SWP1 to SWP3 each include the rotating unit 33 and the nozzle 35. For example, the single-wafer processing units SWP1 to SWP3 may each perform spin drying after treatment with deionized water and IPA.

(5) In the embodiment and the modifications described above, the underwater posture turning unit 24 moves the substrates W upward one by one from the liquid level. However, such an embodiment is not limitative in the present invention. That is, when the center robot CR includes the two hands 29, the underwater posture turning unit 24 may move every two substrates W from the liquid level. In other words, the numbers of substrates W moved upward from the liquid level may correspond to the number of hands 29 of the center robot CR. Moreover, two or more substrates W within the in-tank carrier 76 may move upward from the liquid level for transporting one substrate W, for example, from the in-tank carrier 76.

(6) In the embodiment and modifications described above, the substrate treating apparatus 1 includes the loading and unloading block 3 and the stocker block 5. In this regard, the substrate treating apparatus 1 need not include the loading and unloading block 3 and the stocker block 5. In this case, a plurality of shelves 18A may be arranged on an outer wall of the transferring block 7. That is, a plurality of shelves 18A may be provided adjacent to the transferring block 7. Then, the collective transport mechanism HTR may transport twenty-five substrates W1 (W2) from two carriers C placed on the two shelves 18A individually successively, for example.

(7) In the embodiment and the modifications described above, the substrate alignment direction moving unit 53 of the second transport mechanism WTR2 moves the one-paired chucks 41, 42 horizontally relative to the substrate holder 27 of the lifter LF3 in the alignment direction (transverse direction Y) where the fifty substrates W (treatment substrate group) are aligned. Accordingly, the chucks 41, 42 are moved between the first holding position and the second holding position.

In this regard, instead of the substrate alignment direction moving unit 53 of the second transport mechanism WTR2, the lifter LF3 of the deionized water processing unit ONB may include a moving unit (not shown). In this case, the moving unit of the lifter LF3 may cause the substrate holder 27 to move horizontally relative to the chucks 41, 42 of the second transport mechanism WTR2 in the alignment direction of the fifty substrates W. The substrate alignment direction moving unit 53 of the second transport mechanism WTR2 or the moving unit of the lifter LF3 corresponds to the alignment direction relative moving unit in the present invention.

(8) In the embodiment and the modifications described above, the lifting mechanism 28 of the lifter LF3 moves the substrate holder 27 upward and downward relative to the second transport mechanism WTR2 (one-paired chucks 41, 42). In this regard, the second transport mechanism WTR2 may include a lifting mechanism not shown. In this case, the lifting mechanism of the second transport mechanism WTR2 may move at least one-paired chucks 41, 42 and the swing unit 51 upward and downward relative to the substrate holder 27 of the lifter LF3.

Moreover, the lifting mechanism 28 of the lifter LF3 may move the substrate holder 27 upward and downward, and the lifting mechanism of the second transport mechanism WTR2 may move at least one-paired chucks 41, 42 and the swing unit 51 upward and downward. That is, at least either the lifting mechanism 28 of the lifter LF3 or the lifting mechanism of the second transport mechanism WTR2 corresponds to the relative and lowering lifting unit in the present invention.

(9) In the embodiment and the modifications described above, the in-tank carrier 76 moves upward relative to the pusher 75 for accommodating the substrates W1 in the in-tank carrier 76, as shown in FIG. 13B. In this regard, the pusher 75 may move downward. Alternatively, the pusher 75 may move downward, and the in-tank carrier 76 may move upward.

(10) In the embodiment and the modifications described above, the batch processing units BPU1 to BPU3 each perform treatment on the fifty substrates W arranged in a face-to-face system and at a half pitch collectively. In this regard, the batch processing units BPU1 to BPU3 may each perform treatment on the fifty substrates W arranged in a face-to-back system and at a half pitch collectively. The face-to-back system is an alignment manner where a device face and a back face of two adjacent substrates W1, W2 face each other. That is, fifty substrates W in the face-to-back system face in the same direction.

Figure 10:
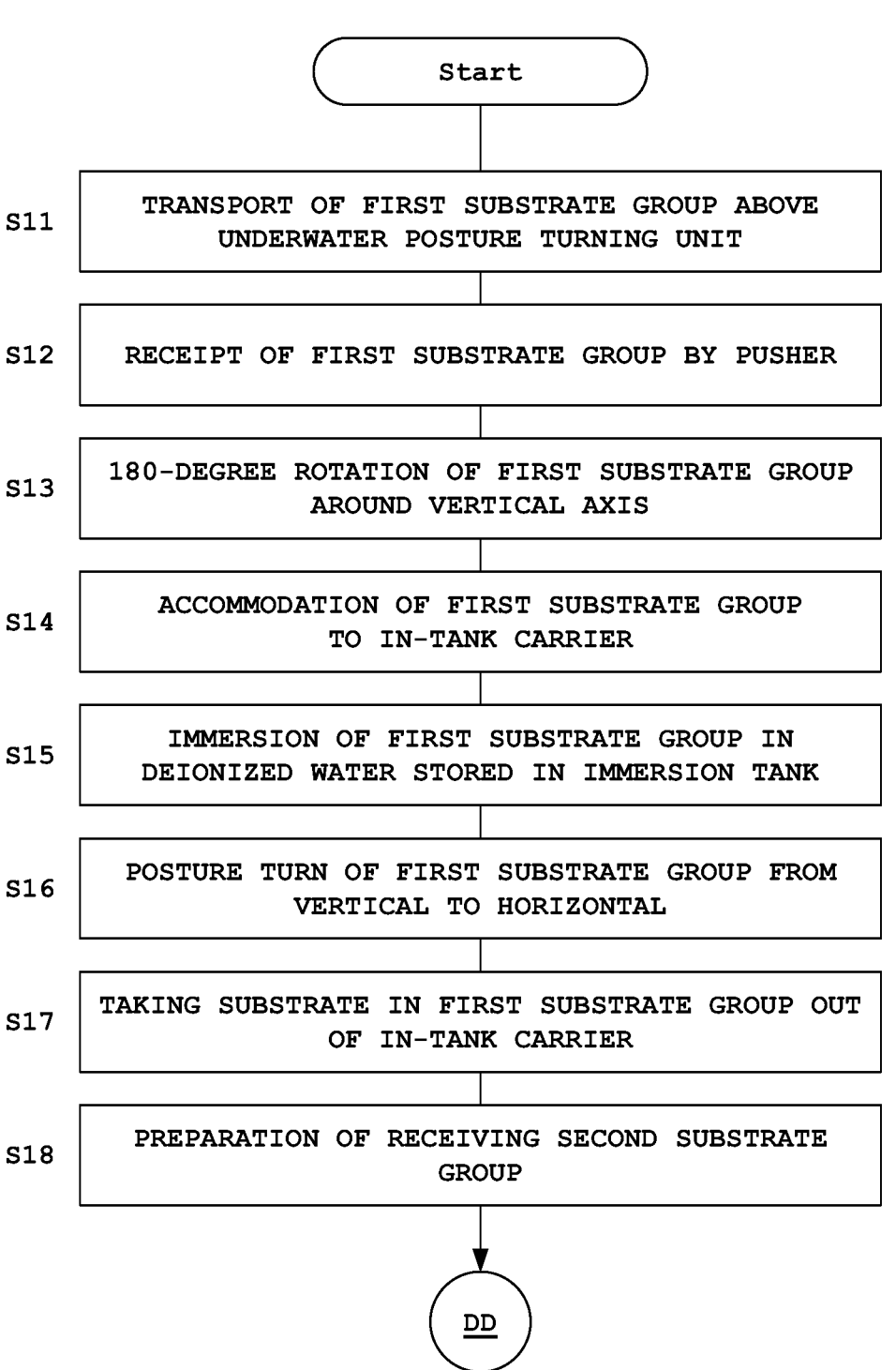
Figure 11:
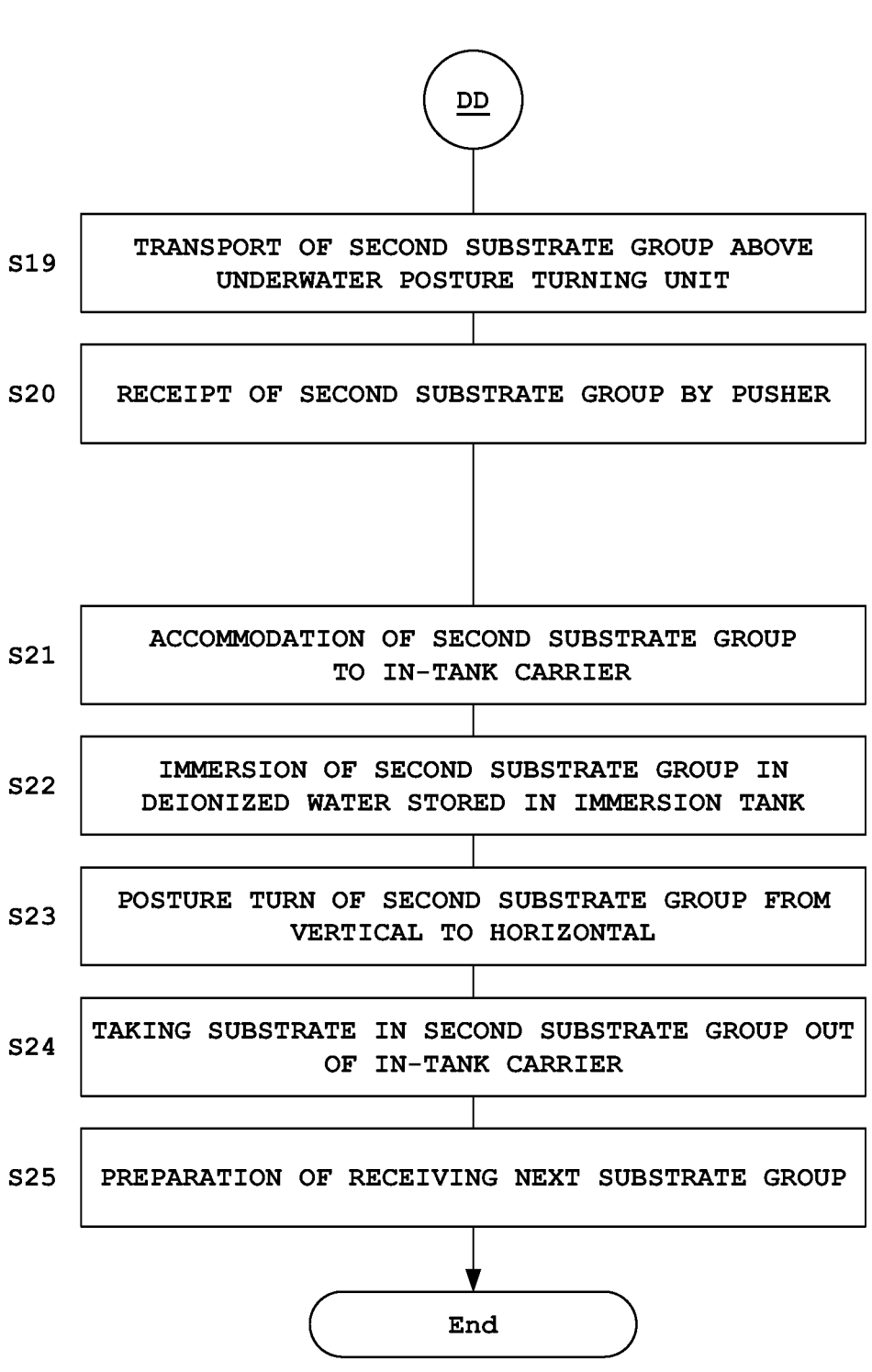

In the face-to-back system, the step S13 in FIG. 10 (180-degree rotation of the first substrate group around the vertical axis) is not necessarily performed. Alternatively, twenty-five substrates W1 in the first substrate group may be rotated by 180 degrees around the vertical axis AX7 in the step S13 in FIG. 10, and twenty-five substrates W2 in the second substrate group may be rotated by 180 degrees around the vertical axis AX7 between the two steps S20, S21 in FIG. 11.

(11) In the embodiment and the modifications described above, in order to prepare fifty substrates W (treatment substrate groups) arranged in a face-to-face system at a half pitch, the twenty-five substrates W1 are rotated by 180 degrees around the vertical axis AX3, and the twenty-five substrates W2 are not rotated around the vertical axis AX3 in FIGS. 3A to 3F. In this regard, such tasks are interchangeable among them. That is, in order to prepare fifty substrates W, the twenty-five substrates W1 may not be rotated around the vertical axis AX3, but the twenty-five substrates W2 may be rotated by 180 degrees around the vertical axis AX3.

Likewise, the twenty-five substrates W1 (first divided substrate group) are rotated by 180 degrees around the vertical axis AX7, and the twenty-five substrates W2 (second divided substrate group) are not rotated around the vertical axis AX7 in FIGS. 13A to 16D in order to turn the posture of the fifty substrates W by two times. In this regard, such tasks are interchangeable among them. That is, in order to turn the posture by two times, the twenty-five substrates W1 may not be rotated around the vertical axis AX7, but the twenty-five substrates W2 (second divided substrate group) may be rotated by 180 degrees around the vertical axis AX7.

(12) In the embodiment and the modifications described above, the batch processing units BPU1 to BPU3 each perform treatment on a plurality of substrates W arranged at a half pitch collectively. In this regard, the batch processing units BPU1 to BPU3 may each perform treatment on the substrates W arranged at a full pitch collectively.

(13) In the embodiment and the modifications described above, the substrate treating apparatus 1 includes one underwater posture turning unit 24 for turning the posture of the substrates W from vertical to horizontal. In this regard, the substrate treating apparatus 1 may include a plurality of underwater posture turning units 24.

The present invention may be embodied in other specific forms without departing from the spirit or essential attributes thereof and, accordingly, reference should be made to the appended claims, rather than to the foregoing specification, as indicating the scope of the invention.

What is claimed is:

1. A substrate treating apparatus provided with a batch processing unit configured to perform treatment on a plurality of substrates collectively, and a single-wafer processing unit configured to perform treatment on the plurality of substrates one by one, the substrate treating apparatus comprising:

a vertical substrate holder configured to hold a treatment substrate group treated in the batch processing unit and constituted by the plurality of substrates arranged in a vertical posture at a given pitch, the vertical substrate holder having holding grooves;

a vertical substrate transporting robot configured to pull out the plurality of substrates by two times from the treatment substrate group, held by the vertical substrate holder, to generate divided substrate groups, and capable of transporting separately the divided substrate groups pulled out by two times;

a posture turning unit configured to turn each posture of the divided substrate groups, transported by the vertical substrate transporting robot, from vertical to horizontal collectively;

a horizontal substrate transporting robot configured to take one substrate from each of the divided substrate groups, whose posture is turned to horizontal by the posture turning unit, and to transport the one substrate to the single-wafer processing unit;

a relative lifting and lowering unit configured to move the vertical substrate holder and the vertical substrate transporting robot upward and downward relatively; and an alignment direction relative moving unit configured to move the vertical substrate holder and the vertical substrate transporting robot relatively horizontally in an alignment direction where the treatment substrate group is aligned, the vertical substrate transporting robot including:

one-paired chucks configured to grip two sides of each outer edge of the substrates in the treatment substrate group individually;

plural-paired holding grooves provided in the one-paired chucks in such a manner so as to face each other and configured to hold the substrates one by one in the vertical posture; and plural-paired passing grooves provided in the one-paired chucks in such a manner so as to face each other and configured to pass the substrates one by one in the vertical posture, wherein the holding grooves and the passing grooves are alternately arranged one by one in the alignment direction of the treatment substrate group, the relative lifting and lowering unit performs relative lifting and lowering movement two times to each of the vertical substrate holder and the vertical substrate transporting robot at a given substrate delivery position, the vertical substrate transporting robot takes a first divided substrate group, in which the substrates are aligned alternately, from the vertical substrate holder by a first relative lifting and lowering movement while holding with the holding grooves, and transports the taken first divided substrate group to the posture turning unit, while the vertical substrate transporting robot passes a residual second divided substrate group through the passing grooves by the first relative lifting and lowering movement, thereby keeping the second divided substrate group held with the vertical substrate holder, the alignment direction relative moving unit moves the vertical substrate transporting robot and the vertical substrate holder, from which the first divided substrate group is taken out and which holds the second divided substrate group, relatively horizontally by the given pitch in the alignment direction of the treatment substrate group, and after the horizontal movement, the vertical substrate transporting robot receives the second divided substrate group, held with the vertical substrate holder by the second relative lifting and lowering movement, while holding with the holding grooves, and transports the received second divided substrate group to the posture turning unit, the posture turning unit includes:

an in-tank carrier having a front opening configured to pass the divided substrate groups individually, two side walls where the plural-paired substrate holding grooves for accommodating each of the divided substrate groups passing the front opening face one another, and a back wall having a back opening whose area is smaller than an area of the front opening and facing the front opening;

a carrier lifter having a carrier supporting portion configured to support the in-tank carrier, and a carrier lifting mechanism configured to move the carrier supporting portion upward and downward;

an immersion tank configured to accommodate the in-tank carrier and the carrier supporting portion, and to store an immersion liquid;

a carrier rotating mechanism configured to rotate the in-tank carrier around a horizontal axis, the in-tank carrier being immersed in the immersion liquid within the immersion tank, for collectively turning each posture of the divided substrate groups from vertical to horizontal;

a pusher configured to hold, from below, each of the divided substrate groups held by the vertical substrate transporting robot;

a pusher lifting mechanism configured to move the pusher upward and downward; and a pusher rotating mechanism configured to rotate the pusher around a vertical axis, wherein when the front opening of the in-tank carrier is directed upward, the pusher can pass the back opening and the front opening of the in-tank carrier and move upward and downward between a position adjacent to a bottom face of the immersion tank and a position above the immersion tank, and when the pusher is changed from a state above the in-tank carrier to a state below the in-tank carrier, the in-tank carrier receives the divided substrate groups from the pusher individually.

2. The substrate treating apparatus according to claim 1, further comprising:

a control unit, wherein the control unit causes the pusher lifting mechanism to move the pusher upward to the above of the in-tank carrier whose front opening is directed upward, whereby the first divided substrate group is received from the vertical substrate transporting robot by the pusher, the control unit causes the pusher rotating mechanism to rotate the pusher, holding the first divided substrate group, by 180 degrees around the vertical axis, the control unit causes the in-tank carrier to move upward relatively, whereby the first divided substrate group rotated by 180 degrees is accommodated in the in-tank carrier, and the control unit causes the carrier rotating mechanism to rotate the in-tank carrier immersed in the immersion liquid within the immersion tank around the horizontal axis, whereby a posture of the first divided substrate group is turned from vertical to horizontal.

3. The substrate treating apparatus according to claim 1, wherein the carrier rotating mechanism includes:

two shafts configured to grip the in-tank carrier and release gripping of the in-tank carrier, and a rotation driving unit configured to rotate the two shafts around the horizontal axis.

* * * * *